US012787019B2

United States Patent

(12) United States Patent
Farag et al.

(10) Patent No.: US 12,787,019 B2
(45) Date of Patent: Nov. 3, 2026

(54) METHOD AND APPARATUS FOR UE INITIATED BEAM ACTIVATION

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 17/657,928

(22) Filed: Apr. 4, 2022

(65) Prior Publication Data

US 2022/0330220 A1 Oct. 13, 2022

Related U.S. Application Data

(60) Provisional application No. 63/174,373, filed on Apr. 13, 2021.

(51) Int. Cl.

*H04W 72/00* (2023.01)
*H04L 5/00* (2006.01)
*H04W 72/044* (2023.01)
*H04W 72/231* (2023.01)

(52) U.S. Cl.

CPC ......... *H04W 72/231* (2023.01); *H04L 5/0053* (2013.01); *H04W 72/046* (2013.01)

(58) Field of Classification Search

None

See application file for complete search history.

(56) References Cited

U.S. PATENT DOCUMENTS

| | | | |
|---|---|---|---|
| 2020/0002938 A1 | 1/2020 | Venugopal et al. | |
| 2021/0314038 A1 | 10/2021 | Matsumura et al. | |
| 2021/0409175 A1* | 12/2021 | Matsumura | H04L 5/0048 |
| 2022/0264577 A1* | 8/2022 | Bai | H04W 72/53 |
| 2023/0064231 A1* | 3/2023 | Haghighat | H04L 5/0053 |
| 2023/0370238 A1* | 11/2023 | Liu | H04B 7/0639 |
| 2024/0014975 A1* | 1/2024 | Zhou | H04B 7/06952 |
| 2024/0040584 A1* | 2/2024 | Yuan | H04W 72/23 |
| 2024/0089066 A1* | 3/2024 | Yuan | H04B 7/0695 |

(Continued)

FOREIGN PATENT DOCUMENTS

| | | | |
|---|---|---|---|
| WO | WO-2019214665 A1 * | 11/2019 | H04W 72/542 |
| WO | 2020021723 A1 | 1/2020 | |
| WO | 2021059162 A1 | 4/2021 | |

OTHER PUBLICATIONS

"3rd Generation Partnership Project; Technical Specification Group Radio Access Network; NR; Physical channels and modulation (Release 17)", 3GPP TS 38.211 V17.0.0, Dec. 2021, 134 pages.

(Continued)

*Primary Examiner* — Brandon M Renner

(57) ABSTRACT

Methods and apparatuses for a user equipment (UE) initiated beam activation in a wireless communication system. A method of operating a UE includes receiving configuration information including a list of transmission configuration indication (TCI) states, determining TCI states, from the list of TCI states, to activate, and transmitting, to a base station (BS), information indicating the activated TCI states.

18 Claims, 12 Drawing Sheets

(56) References Cited

U.S. PATENT DOCUMENTS

| | | | | |
|---|---|---|---|---|
| 2024/0098526 | A1* | 3/2024 | Matsumura | H04L 5/0023 |
| 2024/0172229 | A1* | 5/2024 | Gao | H04L 1/1812 |

OTHER PUBLICATIONS

"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
International Search Report and Written Opinion issued Aug. 1, 2022 regarding International Application No. PCT/KR2022/005326, 8 pages.
MediaTek Inc., "Enhancement on multi-beam operation", 3GPP TSG RAN WG1 #104b-e, R1-2102675, Apr. 2021, 34 pages.
Futurewei, "Enhancement on multi-beam operation", 3GPP TSG RAN WG1 Meeting #104-e, R1-2100044, Jan. 2021, 13 pages.
Extended European Search Report issued May 16, 2024 regarding Application No. 22788422.8, 10 pages.
OPPO, "Discussion on Further Enhancements for Multi-Beam Operation", 3GPP TSG RAN WG1 #104b-e, R1-2102479, Apr. 2021, 3 pages.
OPPO, "Enhancements on Multi-Beam Operation", 3GPP TSG RAN WG1 #104b-e, R1-2102378, Apr. 2021, 20 pages.
Office Action issued Apr. 9, 2026, in connection with European Patent Application No. 22788422.8, 8 pages.

* cited by examiner

METHOD AND APPARATUS FOR UE INITIATED BEAM ACTIVATION

CROSS-REFERENCE TO RELATED APPLICATIONS AND CLAIM OF PRIORITY

The present application claims priority to U.S. Provisional Patent Application No. 63/174,373, filed on Apr. 13, 2021. The content of the above-identified patent documents are incorporated herein by reference.

TECHNICAL FIELD

The present disclosure relates generally to wireless communication systems and, more specifically, the present disclosure relates to a user equipment (UE) initiated beam activation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a UE initiated beam activation in a wireless communication system.

In one embodiment, a UE is provided. The UE includes a transceiver configured to receive configuration information including a list of transmission configuration indication (TCI) states. The UE further includes a processor operably coupled to the transceiver, the processor configured to determine TCI states, from the list of TCI states, to activate. The transceiver is further configured to transmit, to a base station (BS), information indicating the activated TCI states.

In another embodiment, a BS is provided. The BS includes a transceiver configured to transmit configuration information including a list of TCI states, and receive a list of activated TCI states based on the list of TCI states.

In yet another embodiment, a method of operating a UE is provided. The method includes receiving configuration information including a list of TCI states, determining TCI states, from the list of TCI states, to activate, and transmitting, to a base station (BS), information indicating the activated TCI states.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.0.0, "NR; Physical channels and modulation"; 3GPP TS 38.212 v17.0.0, "NR; Multiplexing and Channel coding"; 3GPP TS 38.213 v17.0.0, "NR; Physical Layer Procedures for Control"; 3GPP TS 38.214 v17.0.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification."

Figure 1:
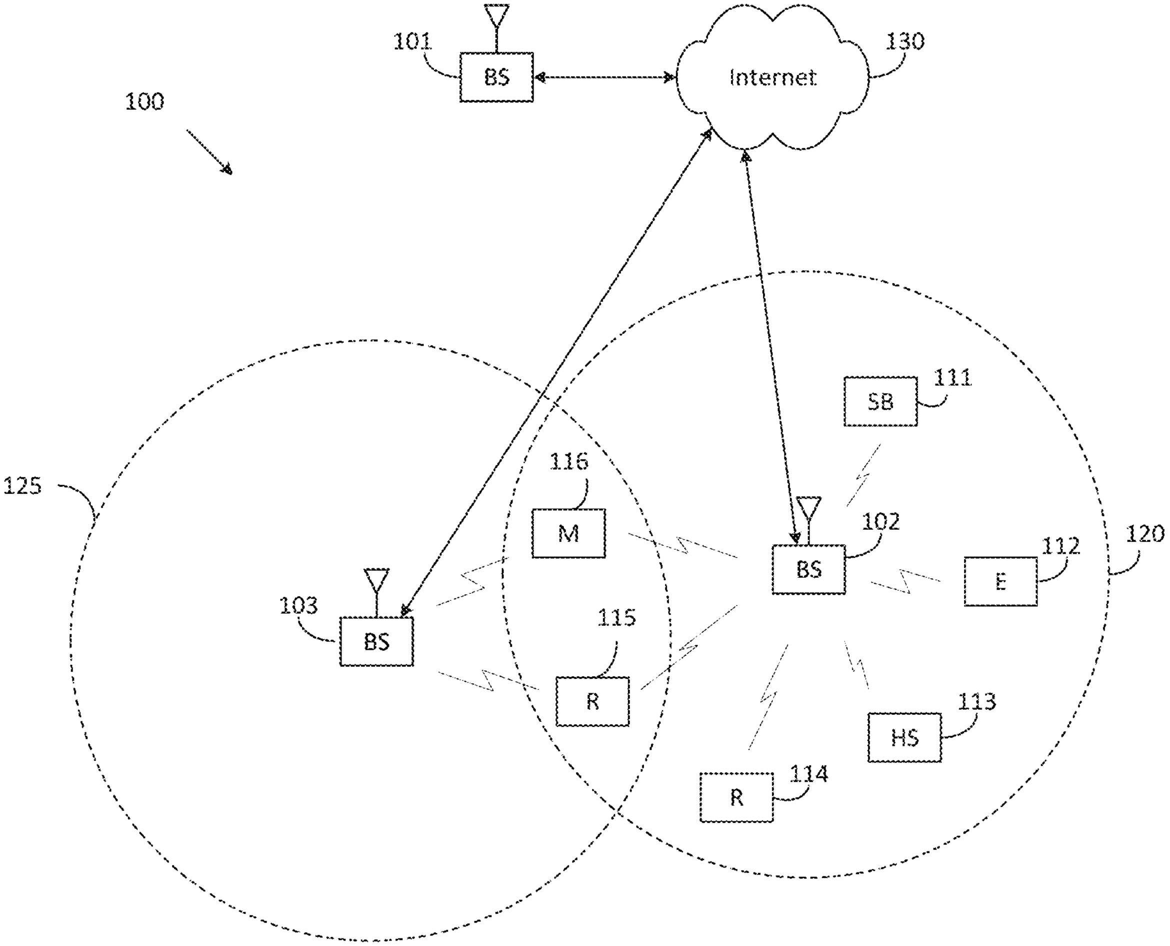
FIG. 1 illustrates an example of wireless network according to embodiments of the present disclosure.
Figure 2:
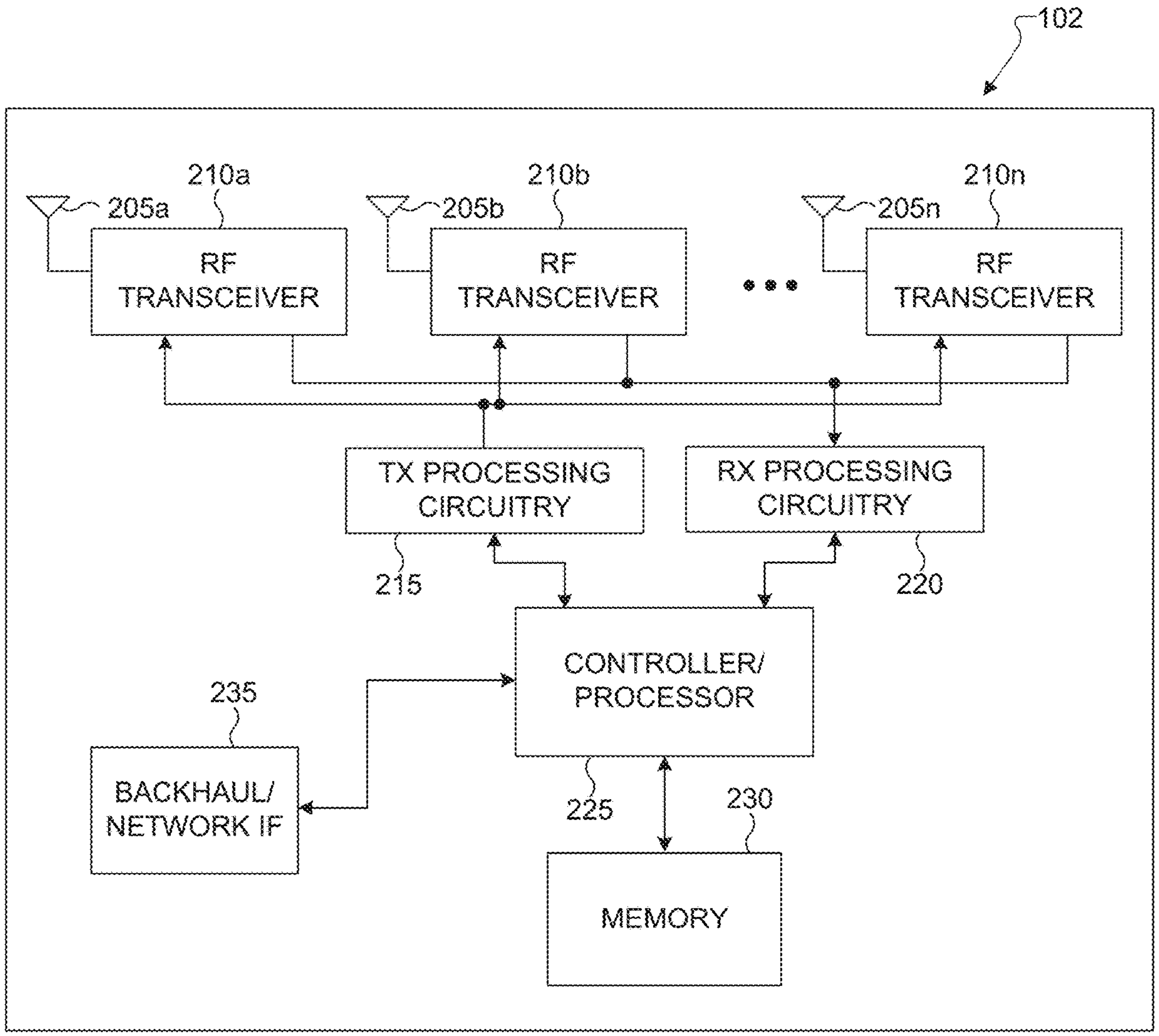
FIG. 2 illustrates an example of gNB according to embodiments of the present disclosure.
Figure 3:
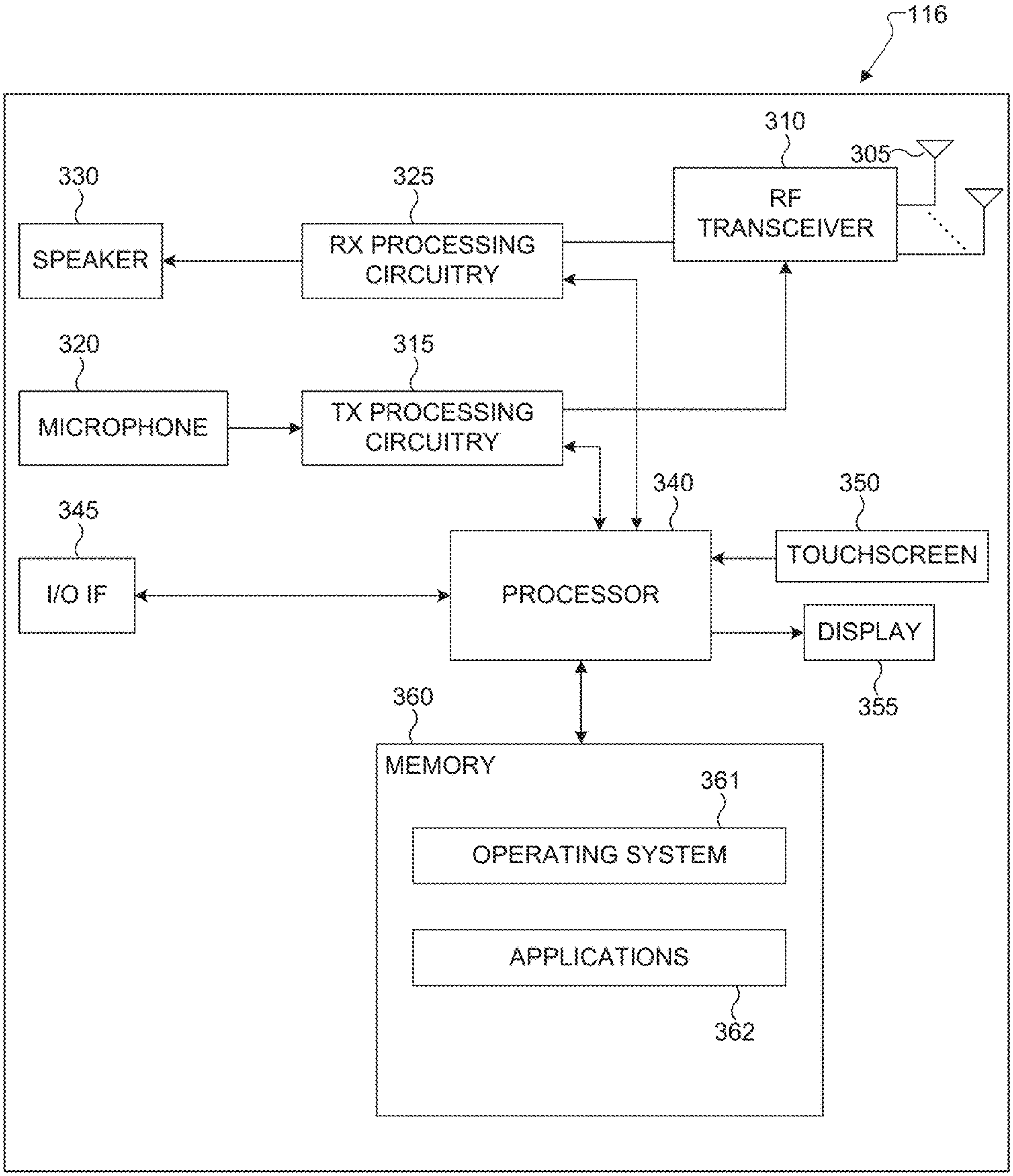
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a UE initiated beam activation in a wireless communication system. In certain embodiments, and one or more of the gNBs 101-103 includes circuitry, programing, or a combination thereof, for a UE initiated beam activation in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple RF transceivers 210*a*-210*n*, transmit (TX) processing circuitry 215, and receive (RX) processing circuitry 220. The gNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a UE initiated beam activation in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a UE initiated beam activation in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
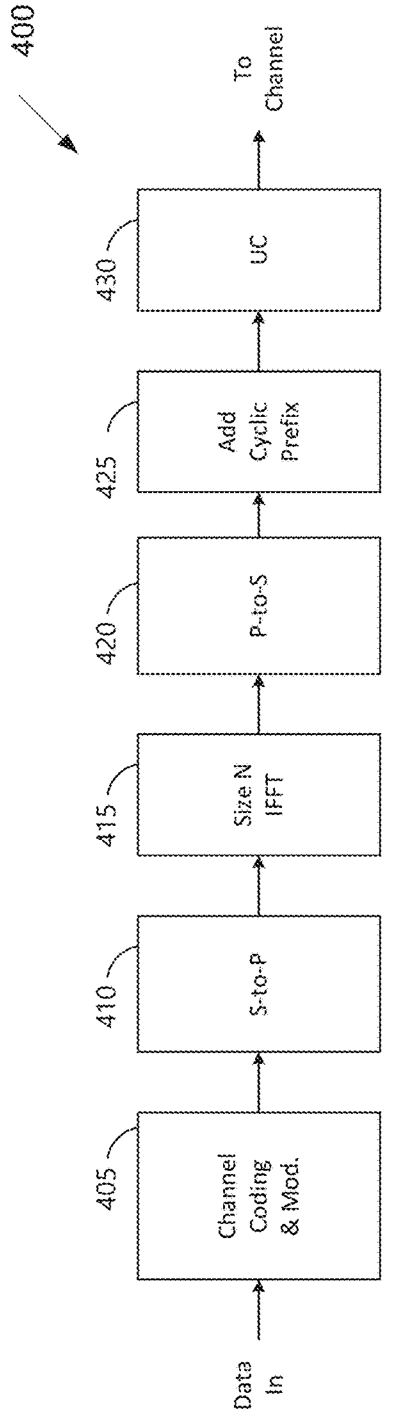
FIGS. 4 and 5 illustrate example of wireless transmit and receive paths according to this disclosure.
Figure 5:
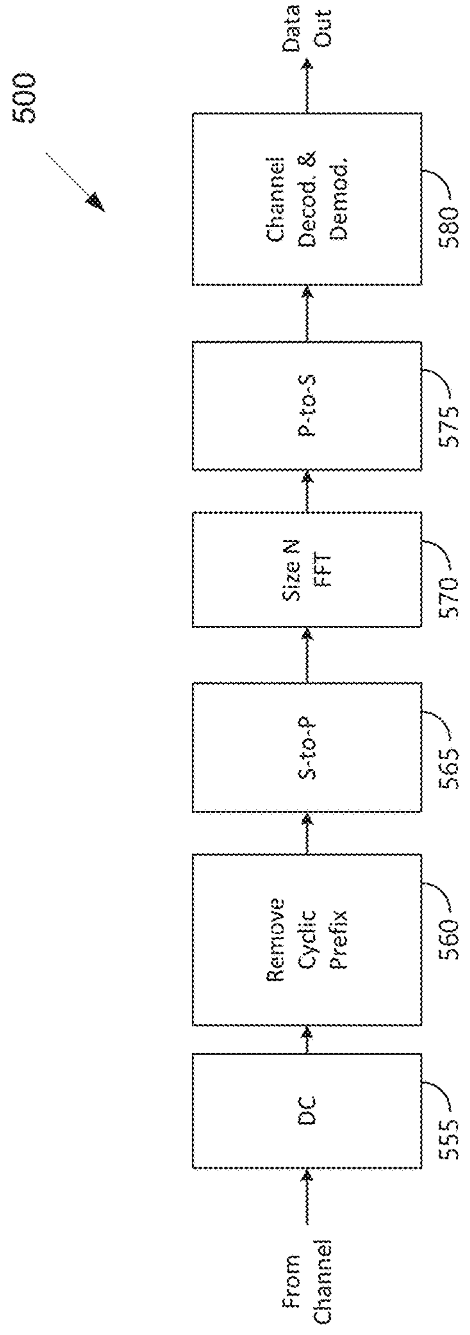

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel.

Rel-17 introduced the unified TCI framework, where a unified or master or main or indicated TCI state or TCI state ID is signaled or indicated to the UE. The unified or master or main or indicated TCI state can be one of:

1. In case of joint TCI state indication, where a same beam is used for DL and UL channels, a joint TCI state that can be used at least for UE-dedicated DL channels (to determine the QCL assumptions) and UE-dedicated UL channels (to determine the spatial relation or spatial filter).
2. In case of separate TCI state indication, where different beams are used for DL and UL channels, a DL TCI state can be used at least for UE-dedicated DL channels (to determine the QCL assumptions).
3. In case of separate TCI state indication, where different beams are used for DL and UL channels, a UL TCI state can be used at least for UE-dedicated UL channels (to determine the spatial relation or spatial filter).

The unified (or indicated or master or main) TCI state is TCI state of UE-dedicated reception on PDSCH/PDCCH or dynamic-grant/configured-grant based PUSCH and all of dedicated PUCCH resources. Other channels and/or signals can be configured to follow the unified (or indicated or master or main) TCI state.

In the present disclosure, a beam is determined by either of: (1) a TCI state, which establishes a quasi-colocation (QCL) relationship between a source reference signal (e.g., SSB and/or CSI-RS) and a target reference signal; or (2) spatial relation information that establishes an association to a source reference signal, such as SSB or CSI-RS or SRS. In either case, the ID of the source reference signal and/or the ID of the TCI state identifies the beam.

The TCI state and/or the spatial relation reference RS can determine a spatial Rx filter or QCL type, for reception of downlink channels at the UE, or a spatial Tx filter or spatial relation for transmission of uplink channels from the UE. Quasi-co-location (QCL) relation, can be quasi-location with respect to one or more of the following relations [38.214—section 5.1.5]: (1) Type A, {Doppler shift, Doppler spread, average delay, delay spread}, (2) Type B, {Doppler shift, Doppler spread}, (3) Type C, {Doppler shift, average delay}, and (4) Type D, {Spatial Rx parameter}.

Figure 6A:
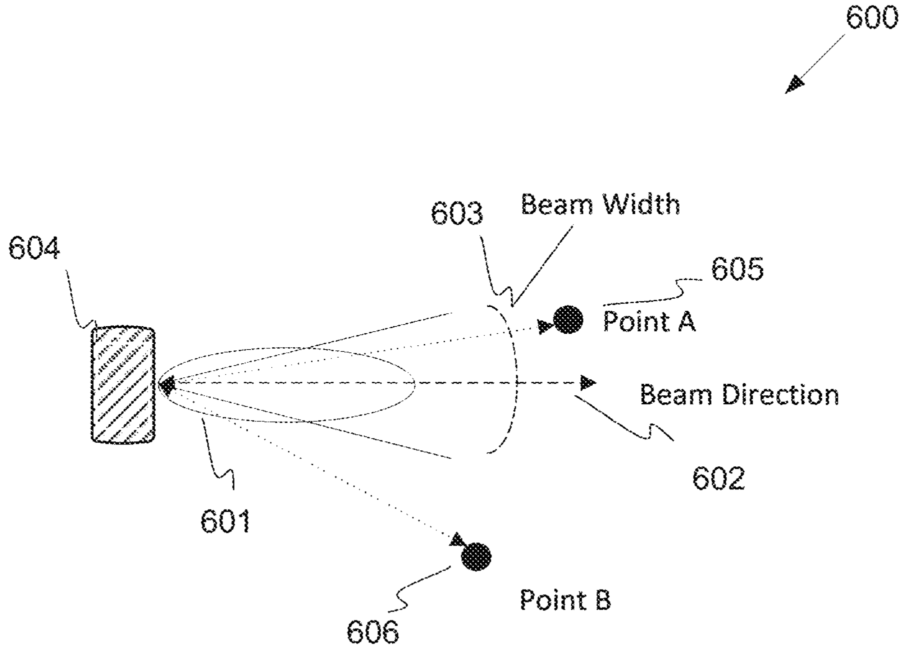
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
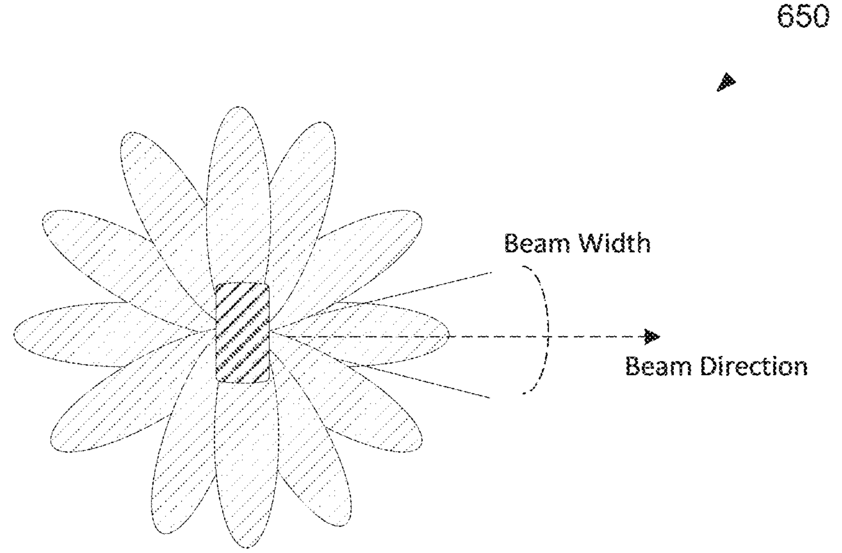
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
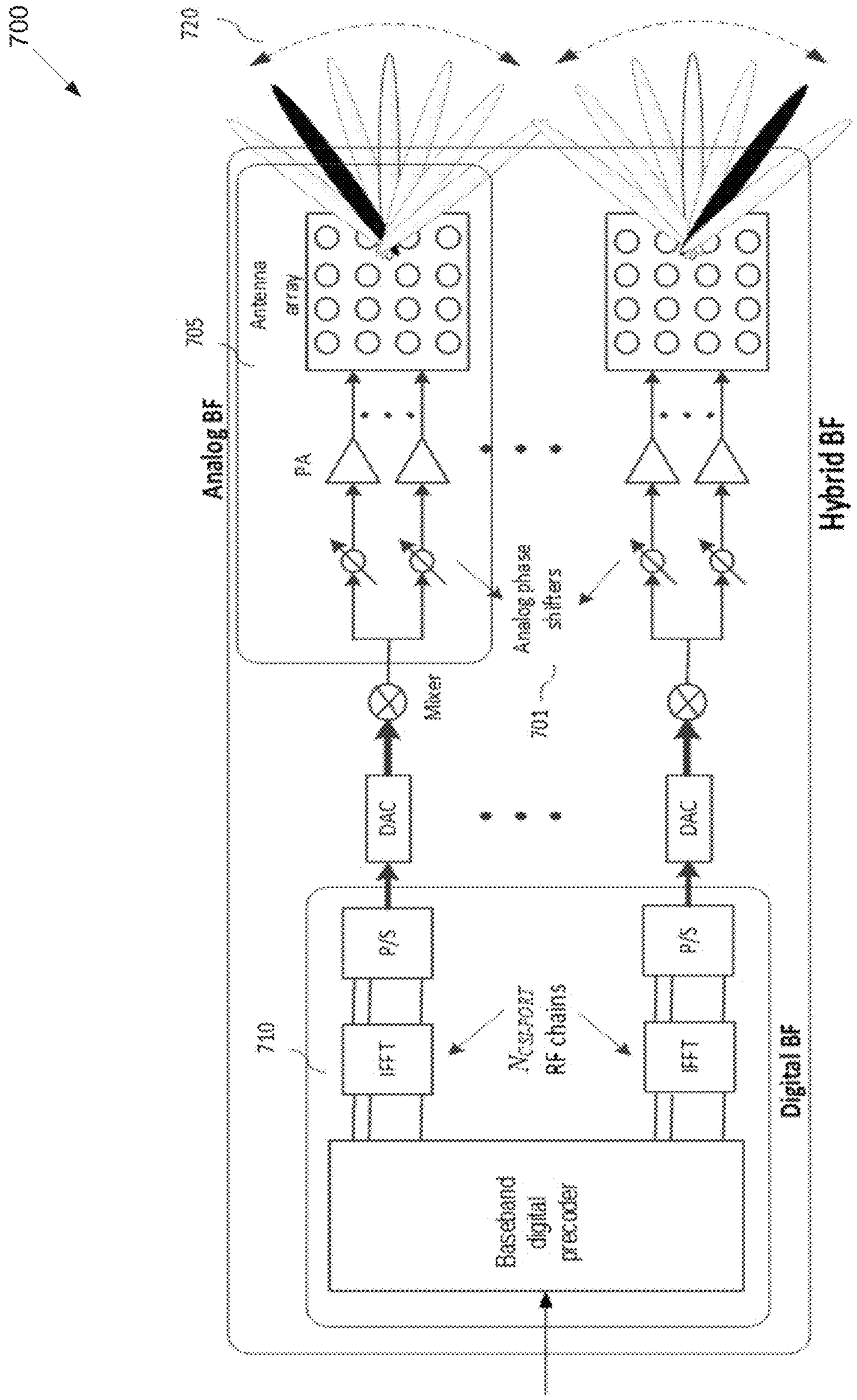
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

In a beam management system after a TCI state, with a source reference signal for a beam has been signaled to be activated, an additional latency is required before the signaled TCI state (beam) can be used for reception or transmission at the UE. The latency depends on whether the TCI state is known or not, or is in the active set or not, as described further in this disclosure. A known TCI state that is in the active set can have a much lower latency between the time of indication (e.g., signaling) and usage (e.g., application). As the additional latency can degrade system performance especially in high speed scenarios, it may be beneficial to activate the TCI state as soon as possible.

In the beam management procedure, a UE measures the channel using the beam measurement reference signals, provides beam measurement report to the network, the network then decides to activate TCI states, and after the activation latency the new TCI states (beams) can be used. To reduce latency, the UE can activate the TCI states directly after the measurement of the reference signals and informs the network of the activated TCI states.

In the present disclosure, as an example, dividing up the active TCI states into two groups is provided, for example, a first group can be activated by the network and a second group can be activated by the UE and indicated to the network. This can apply to the TCI states of a serving cell(s) as well as non-serving cells. In this disclosure, a non-serving cell, refers to a cell (or a TRP of a cell) with a physical cell identity (PCI) that is different from the PCI of the serving cell. The UE can receiver and/or transmit at least UE-dedicated channels from the non-serving cell.

Although exemplary descriptions and embodiments to follow assume OFDM or OFDMA, the present disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, TCI state IDs, SpatialRelationInfo, target RS, reference RS, source RS, target RS IDs, source RS ID, RS IDs, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, which is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS, or can be configured with a certain time-domain behavior, such as a periodicity and offset in case of periodic RS, or can be a combination of such configuration and activation/deactivation in case of semi-persistent RS.

For mmWave bands (or FR2) or for higher frequency bands (such as >52.6 GHz) where multi-beam operation is especially relevant, a transmission-reception process includes a receiver selecting an RX beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS.

In this case, the UE determines the TX-RX beam pair for every configured DL reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RS s, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In one embodiment of A-1, an aperiodic CSI-RS is transmitted by the NW/gNB and received/measured by the UE. This embodiment can be used regardless of whether or not there is UL-DL beam correspondence.

In another embodiment of A-2, an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 8:
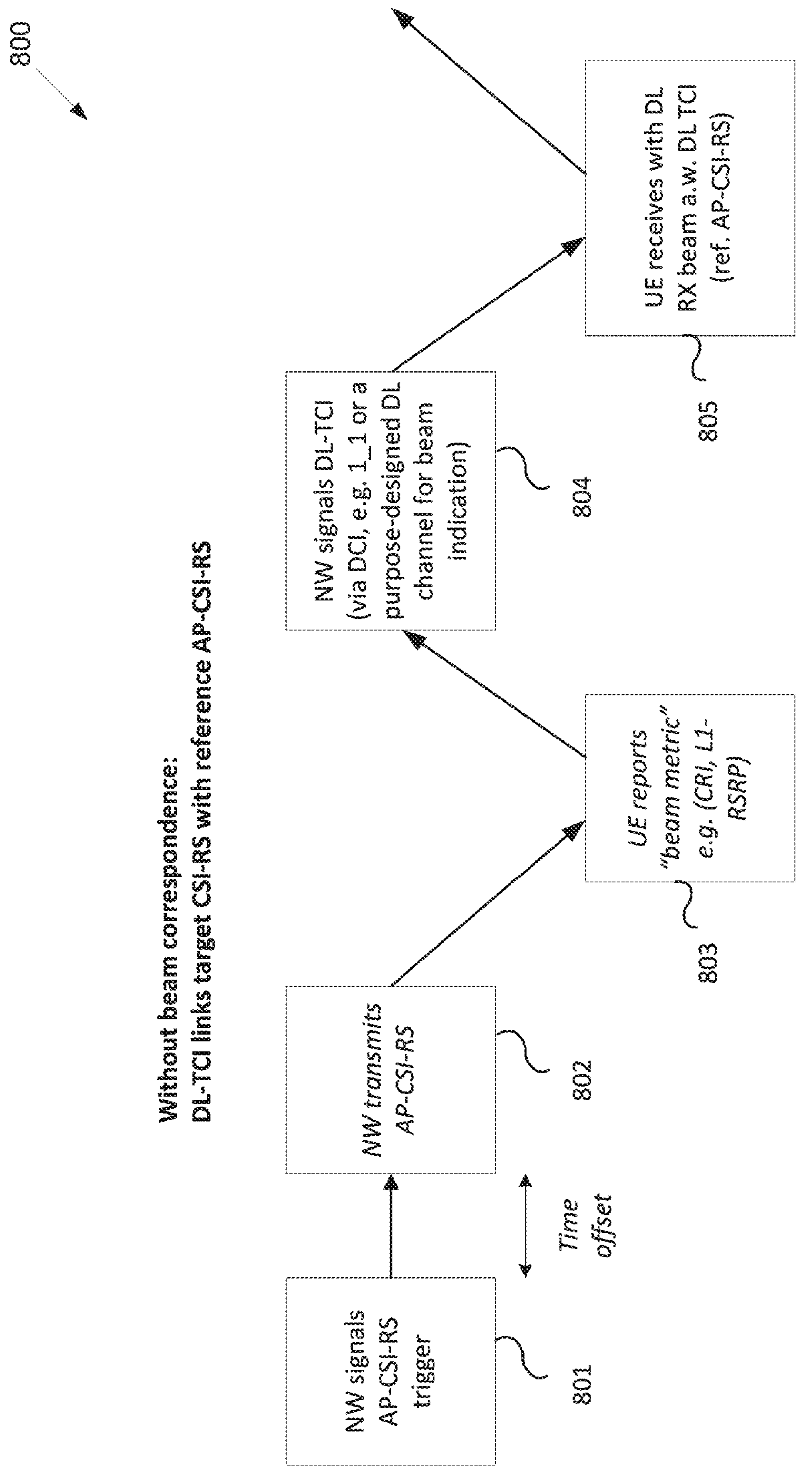
FIG. 8 illustrates an example of DL multi beam operation according to embodiments of the present disclosure.

FIG. 8 illustrates an example of DL multi beam operation 800 according to embodiments of the present disclosure. An embodiment of the DL multi beam operation 800 shown in FIG. 8 is for illustration only.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format (e.g., DCI Format 1_0 or DCI Format 1_1 or DCI Format 1_2) scheduling a PDSCH reception by the UE or a DCI Format 1_0 or DCI Format 1_1 or DCI Format 1_2 without a DL assignment. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, which is linked to the reference RS, such as an AP-CSI-RS. Upon successfully decoding the DCI format providing the TCI-state, the UE selects a DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication.

A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set. In this case, the TCI-state indicates a reference RS, such as an AP-CSI-RS, representing the selected DL TX beam (by the gNB/NW). In addition, the TCI-state can also indicate a "target" RS, such as a CSI-RS, which is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, which is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 9:
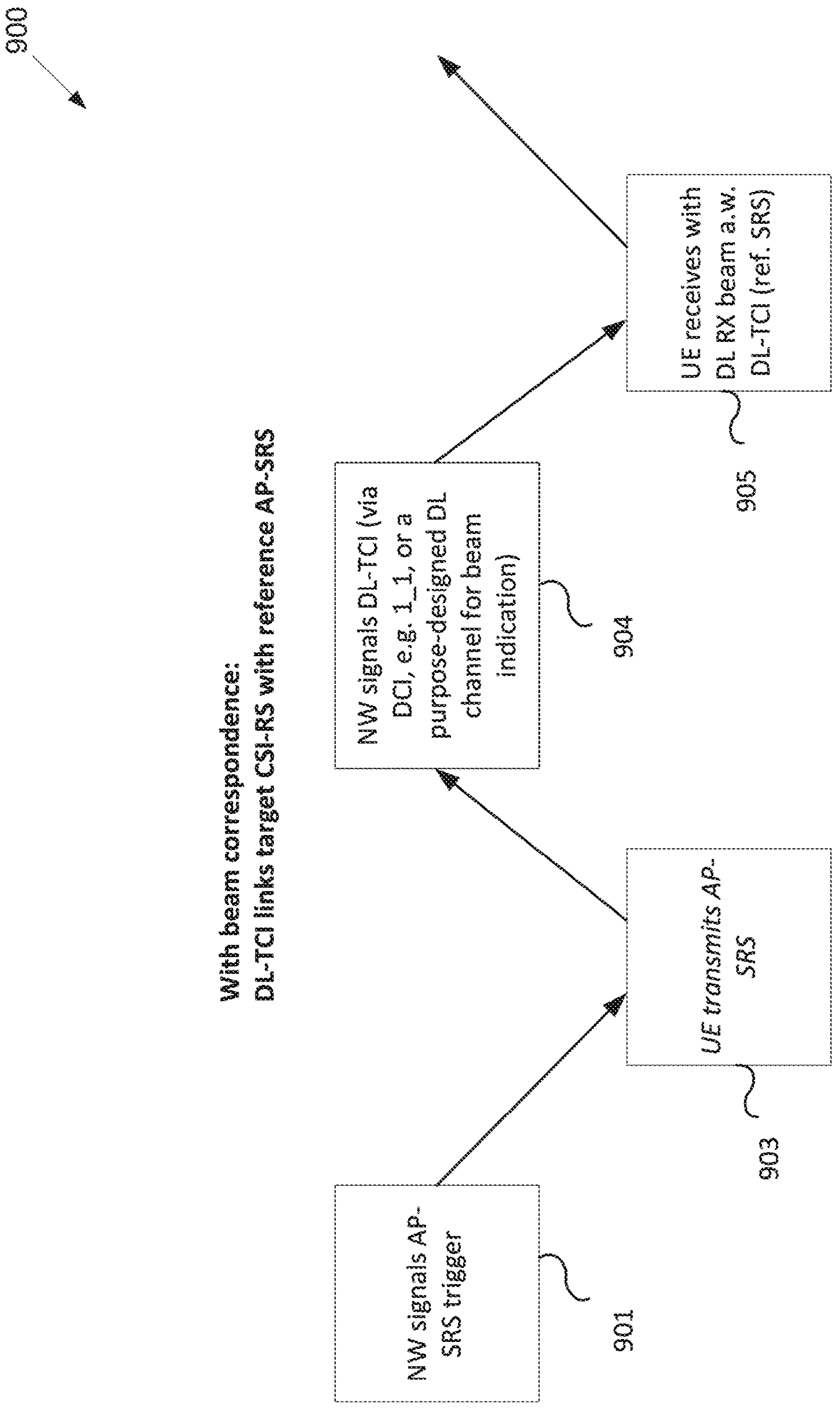
FIG. 9 illustrates an example of DL multi beam operation according to embodiments of the present disclosure.

FIG. 9 illustrates an example of DL multi beam operation 900 according to embodiments of the present disclosure. An embodiment of the DL multi beam operation 900 shown in FIG. 9 is for illustration only.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format (e.g., DCI Format 1_0 or DCI Format 1_1 or DCI Format 1_2) scheduling a PDSCH reception or a DCI Format 1_0 or DCI Format 1_1 or DCI Format 1_2 without a DL assignment. In this case, the TCI state indicates a reference RS, such as an AP-SRS, representing the selected DL RX beam. In addition, the TCI state can also indicate a "target" RS, such as a CSI-RS, which is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the TCI-state indicates a reference RS, such as an AP-SRS, representing the selected DL RX beam. In addition, the TCI-state can also indicate a "target" RS, such as a CSI-RS, which is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similarly, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In one embodiment of B-1, a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In another embodiment of B-2, the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 10:
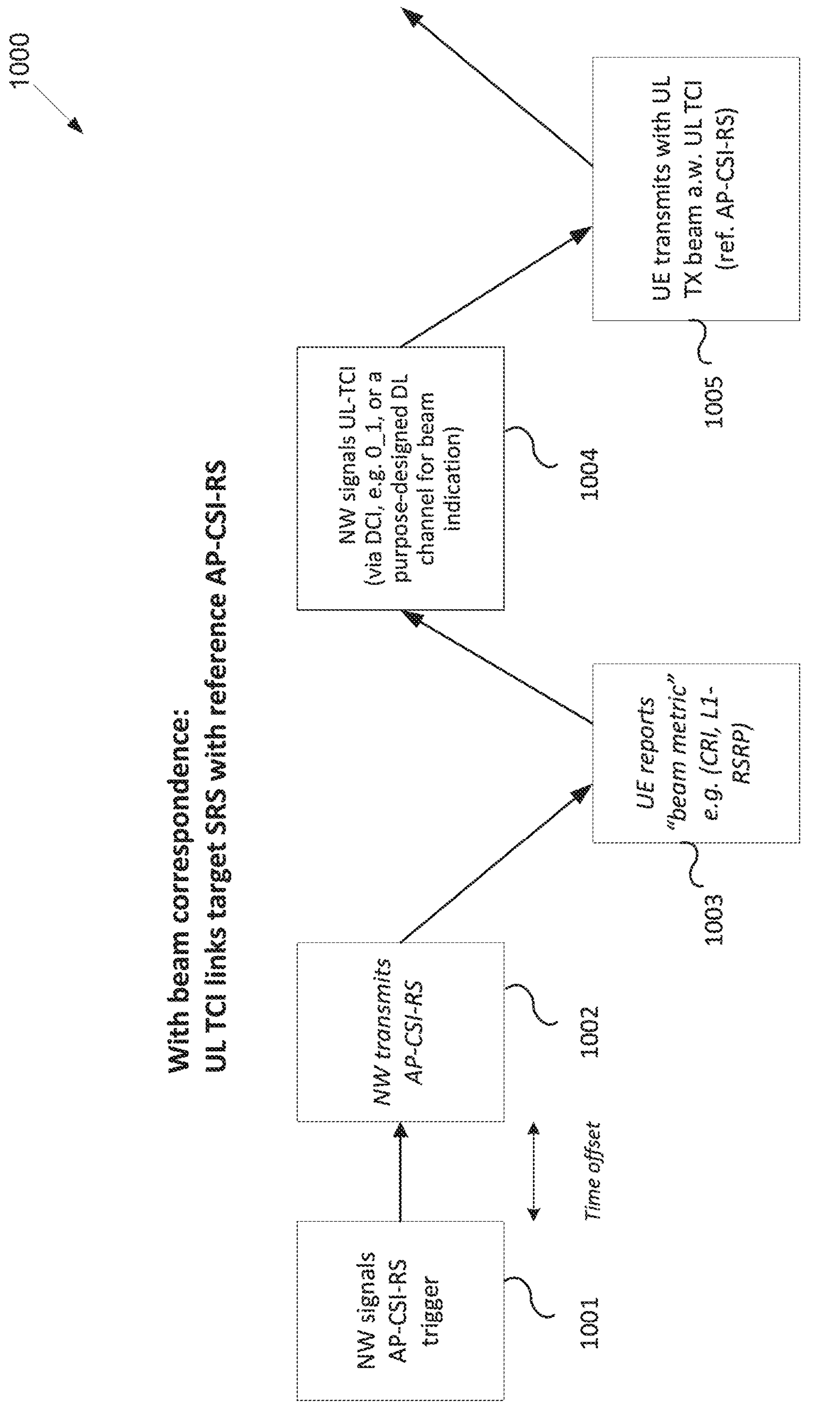
FIG. 10 illustrates an example of UL multi beam operation according to embodiments of the present disclosure.

FIG. 10 illustrates an example of UL multi beam operation 1000 according to embodiments of the present disclosure. An embodiment of the UL multi beam operation 1000 shown in FIG. 10 is for illustration only.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger, and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE, a DCI format (e.g., DCI Format 1_0 or DCI Format 1_1 or DCI Format 1_2) scheduling a PDSCH reception or a DCI Format 1_0 or DCI Format 1_1 or DCI Format 1_2 without a DL assignment. The TCI-state indicates a reference RS, such as an AP-CSI-RS, representing the selected UL RX beam (by the gNB/NW). In addition, the TCI-state can also indicate a "target" RS, such as an SRS, which is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the TCI-state indicates a reference RS, such as an AP-CSI-RS, representing the selected UL RX beam (by the gNB/NW). In addition, the TCI-state can also indicate a "target" RS, such as an SRS, which is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 11:
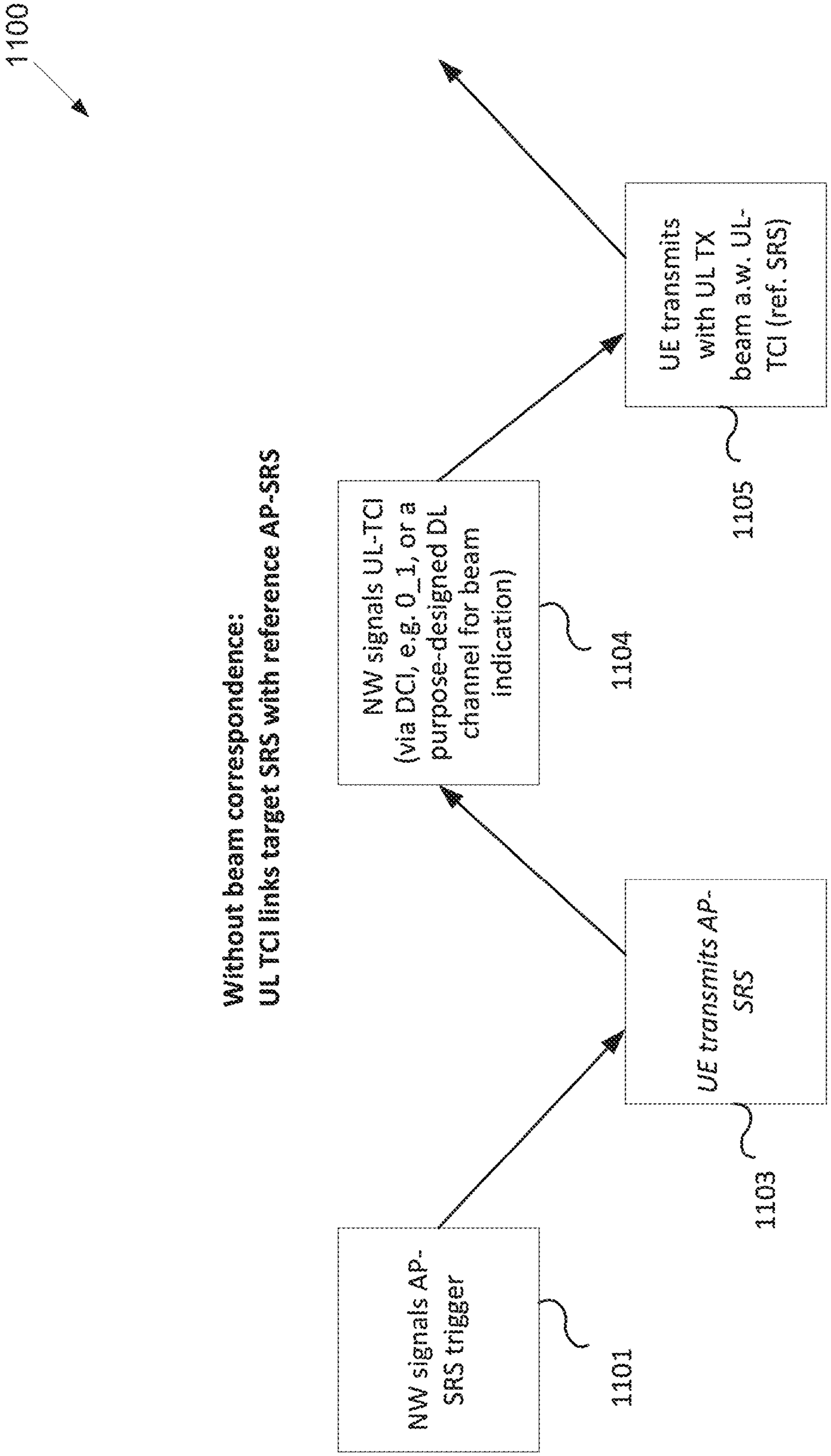
FIG. 11 illustrates an example of UL multi beam operation according to embodiments of the present disclosure.

FIG. 11 illustrates an example of UL multi beam operation 1100 according to embodiments of the present disclosure. An embodiment of the UL multi beam operation 1100 shown in FIG. 11 is for illustration only.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or a gNB) can measure the UL propagation channel and select an UL TX beam for the UE.

The gNB/NW can then indicate the UL TX beam selection (step 1104) using a value of the TCI-state field in the DCI format such as DCI format (e.g., DCI Format 1_0 or DCI Format 1_1 or DCI Format 1_2) scheduling a PDSCH reception or a DCI Format 1_0 or DCI Format 1_1 or DCI Format 1_2 without a DL assignment. In this case, the UL-TCI indicates a reference RS, such as an AP-SRS, representing the selected UL TX beam. In addition, the TCI-state can also indicate a "target" RS, such as an SRS, which is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the UL-TCI indicates a reference RS, such as an AP-SRS, representing the selected UL TX beam.

In addition, the TCI-state can also indicate a "target" RS, such as an SRS, which is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

As described in the 3GPP standard specification 38.133, when a TCI is activated (switched) in slot n by a MAC CE activation command to switch a target TCI state, the UE may be able to receive in a future slot that depends on whether the TCI state is known or unknown, and if known, whether it is in the active list of the PDSCH. The TCI state is known if the following conditions are met [TS 38.133 clause 8.10.2]: During the period from the last transmission of the RS resource used for the L1-RSRP measurement reporting for the target TCI state to the completion of active TCI state switch, where the RS resource for L1-RSRP measurement is the RS in the target TCI state or QCLed to the target TCI state; (1) TCI state switch command is received within 1280 ms upon the last transmission of the RS resource for beam reporting or measurement, (2) the UE has sent at least one L1-RSRP report for the target TCI state before the TCI switch command, (3) the TCI state remains detectable during the TCI switching period, and (4) the SSB associated with the TCI state remains detectable during the TCI switching period, with SNR of the TCI state≥—3 dB. Otherwise the TCI state is unknown.

If the TCI state is unknown [TS 38.133 clause 8.10.3], upon receiving a MAC CE activation command in slot n to switch to a target TCI state, the UE may be able to receive PDCCH with target TCI state in a first slot that is after slot $$n + T_{HARQ} + 3N_{slot}^{subframe,\mu} + T_{L1-RSRP} + TO_{uk}\frac{(T_{first-SSB} + T_{SSB-proc})}{NR \text{ slot length}}.$$

$TO_{Uk}$ is "0" for SSB based L1-RSRP measurement when TCI switching involves QCL-TypeD. $TO_{Uk}$ is "1" for CSI-RS based L1-RSRP measurement when TCI switching involves QCL-TypeD, or when TCI state switching involves QCL Types other than QCL-TypeD.

If the TCI state is known and target TCI state is in the active set, upon receiving a MAC CE activation command to switch to a target TCI state in slot n, the UE may be able to receive PDCCH with target TCI state in a first slot that is after slot $$n + T_{HARQ} + 3N_{slot}^{subframe,\mu}.$$

If the TCI state is known and target TCI state is not in the active set, upon receiving a MAC CE activation command to switch to a target TCI state in slot n, the UE may be able to receive PDSCH with target TCI state in a first slot that is after slot $$n + T_{HARQ} + 3N_{slot}^{subframe,\mu} + \frac{(T_{first-SSB} + T_{SSB-proc})}{NR \text{ slot length}}.$$

In the aforementioned equations: $T_{HARQ}$ is the time between the DL data transmission with the MAC CE command and the corresponding acknowledgment;

$$N_{slot}^{subframe,\mu}$$

is the number of slots in a subframe (of duration 1 ms) for numerology μ; $T_{L1\text{-}RSRP}$ is the time for L1 RSRP measurement for Rx beam refinement as defined in TS 38.133, wherein $T_{L1\text{-}RSRP}=0$, for FR1 or when the TCI state switching doesn't involve QCL-TypeD in FR2, or $T_{L1\text{-}RSRP}$ is defined as $T_{L1\text{-}RSRP\_Measurement\_Period\_SSB}$ for SSB, defined in clause 9.5.4.1 of TS 38.133 with M=1 and $T_{Report}=0$, or $T_{L1\text{-}RSRP}$ is defined as $T_{L1\text{-}RSRP\_Measurement\_Period\_CSI\text{-}RS}$ for CSI-RS, defined in clause 9.5.4.2 of TS 38.133, with the CSI-RS resource configured with higher layer parameter repetition set to on, M=1 for periodic CSI-RS, the number of CSI-RS resources in a resource set at least equal to MaxNumberRxBeam, and $T_{Report}=0$; $T_{first\text{-}SSB}$ is one of (1) the time to the first SSB after the MAC CE with the activation command is decoded when the target TCI state is known or when the target state is unknown and switching doesn't involve QCL TypeD, (2) the time to the first SSB after L1-RSRP measurement when the target TCI state is unknown and switching involves QCL-TypeD. This may depend on the time of the decode and periodicity of the SSB, which can be in the range {5, 10, 20, 40, 80, 160}ms; and $T_{SSB\text{-}proc}$ is the SSB processing time which equals 2 ms.

To reduce the beam activation (or switching) latency, it may be beneficial to have the TCI state known and in the active set.

The beam management procedure includes following embodiments (e.g., steps)—not necessarily in this order.

In one embodiment of Step 1, a UE is configured with measurement reference signals. A measurement reference signal can be one of: (1) synchronization signal/physical broadcast channel (SS/PBCH) Block referred to as SSB; (2) non-zero power channel state information—reference signal (NZP CSI-RS). The NZP CSI-RS can be: (i) one of CSI-RS for beam management, or CSI-RS for CSI acquisition or CSI-RS for tracking also known as tracking reference signal (TRS); (ii) of type: periodic, semi-persistent or aperiodic; or (3) other DL reference signal such as PDCCH DMRS or PDSCH DMRS.

In one example, the measurement reference signals belong to a serving cell (SC). In another example, the measurement reference signals belong to the SC or to a non-serving cell (NSC). A non-serving cell, refers to a cell (or a TRP of a cell) with a physical cell identity (PCI) that is different from the PCI of the serving cell. The UE can receiver and/or transmit at least UE-dedicated channels from the non-serving cell.

In one embodiment of Step 2, a UE is configured with source reference signal, e.g., DL QCL reference or UL spatial reference signal. A source reference signal can be one of: (1) SS/PBCH block referred to as SSB; (2) NZP CSI-RS. The NZP CSI-RS can be: (i) one of CSI-RS for beam management, or CSI-RS for CSI or CSI-RS for tracking also known as TRS; and (ii) of type: Periodic, semi-persistent or aperiodic; (3) sounding reference signal (SRS); (4) other DL reference signal such as PDCCH DMRS or PDSCH DMRS; or (5) other UL reference signal such as PUCCH DMRS or PUSCH DMRS.

In one example, the source reference signals belong to a serving cell (SC). In another example, the source reference signals belong to the SC or to an NSC.

In one embodiment of Step 3, the UE is further configured by RRC configuration a set of TCI states, wherein the set of TCI states can be Joint TCI states (for DL and UL beam indication), DL TCI states (for DL beam indication) or UL TCI states (for UL beam indication). In one example, the UE is configured by higher layer parameter DLorJointTCIState with DL TCI states and/or Joint TCI states. In another example, the UE is configured by higher layer parameter UL-TCIState with UL TCI states.

In one example, the TCI state includes a source reference signal (e.g., for DL QCL Type A and/or B and/or C and/or D reference signal and/or for an UL spatial reference signal) that belong to a SC. In another example the TCI state includes a source reference signal (e.g., for DL QCL Type A and/or B and/or C and/or D reference signal and/or for an UL spatial reference signal) that belong to a SC or NSC.

In one embodiment of Step 4, the UE measures the measurement reference signals and provides a beam report to the network. The beam report can assist the network in determining the activated subsets of TCI states and the indicated TCI state(s) (beam(s)) for reception/transmission of DL/UL channels.

In one embodiment of Step 5, a subset of the RRC configured TCI states is activated my MAC CE signaling. In one example, the activated TCI states are activated as code points for TCI state indication in a DCI Format. In one example, the activated TCI states are M TCI state code points, for example M≤8. In one example, an activated TCI state code point can be: (1) a DL TCI state, (2) an UL TCI state, (3) Joint TCI state, (4) a pair of DL TCI state and UL TCI state. In one example, the MAC CE activates one TCI state code point and the code point is used for beam indication after a beam application time. In one example, if the MAC CE activates a single TCI state (e.g., for DL and/or UL beam indication), the TCI state is used after a beam application time to determine the quasi-co-location for DL reception of channels and signal following the indicated TCI state at the UE, and/or the UL spatial filter (UL spatial relation) for UL transmission of channels and signals following the indicated TCI state at the UE.

In one embodiment of Step 6, a UE is indicated a TCI state, by a channel conveying a beam indication, for example: (1) DL related DCI Format with or without a DL scheduling assignment such as: DCI Format 1_0 or DCI Format 1_1 or DCI Format 1_2; (2) UL related DCI Format with or without an UL scheduling grant such as: DCI Format 0_0 or DCI Format 0_1 or DCI Format 0_2; (3) other DCI Format such as DCI Format 2_0 or DCI Format 2_1 or DCI Format 2_2 or DCI Format 2_3; (4) a DCI Format dedicated for beam indication to a UE or to a group of UEs; and (5) a MAC CE for beam indication. In one example, a DCI Format indicates a code point of the MAC CE activated code points, wherein a code point can be indicated in a DCI field e.g., "transmission configuration indication" field. In one example, the indicated TCI state by a DCI Format is used after a beam application time to determine the quasi-co-location for DL reception of channels and signal following the indicated TCI state at the UE, and/or the UL spatial filter (UL spatial relation) for UL transmission of channels and signal following the indicated TCI state at the UE.

The indicated TCI state is from the subset of activated TCI states.

Figure 12:
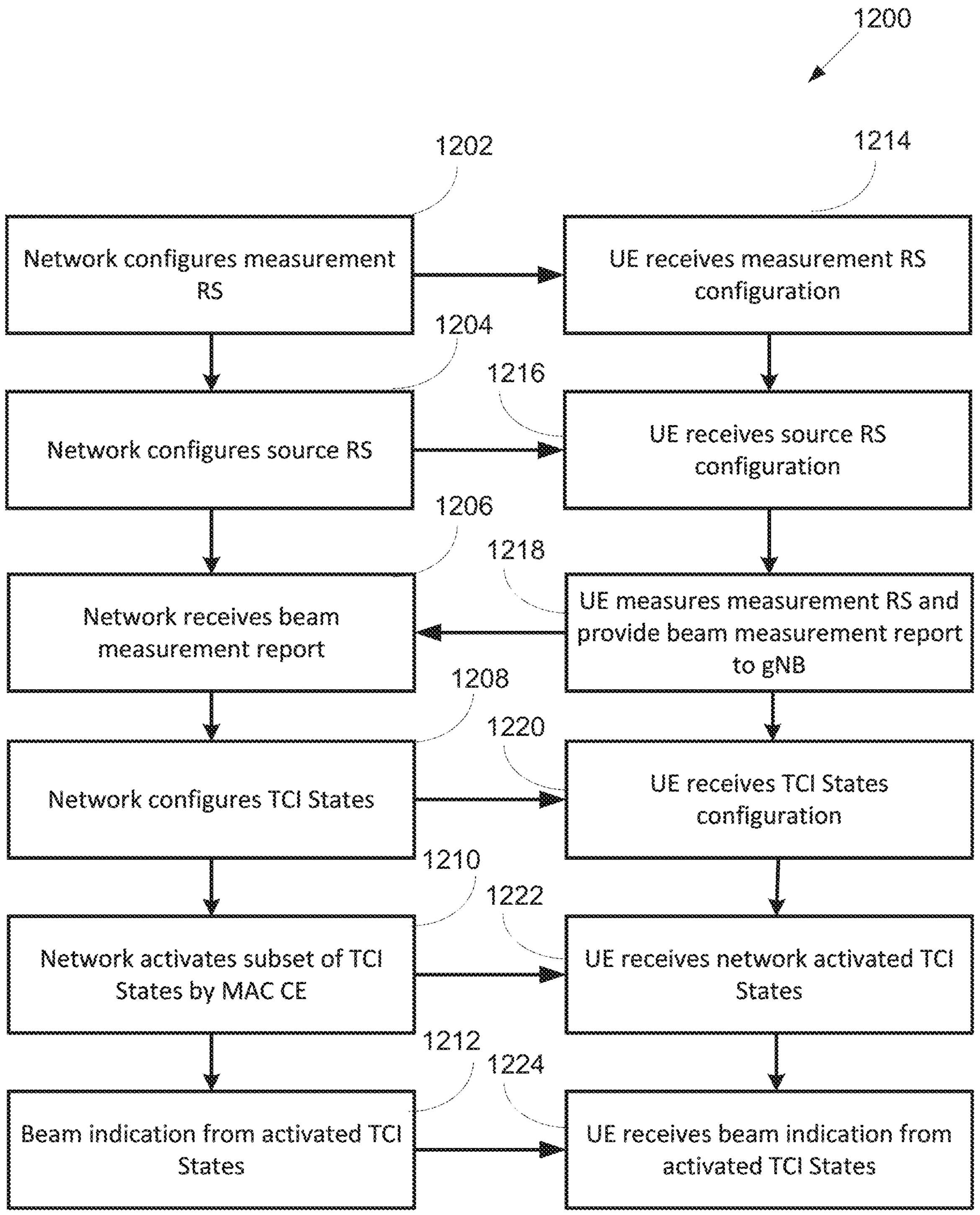
FIG. 12 illustrates a flowchart of method for beam management according to embodiments of the present disclosure.

FIG. 12 illustrates an example of the aforementioned procedure.

FIG. 12 illustrates a flowchart of method 1200 for beam management according to embodiments of the present disclosure. The method 1200 as may be performed by a UE (e.g., 111-116 as illustrated in FIG. 1) and a BS (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As described above, when a TCI state is signaled to be activated, (e.g., in step 5) it cannot be used for reception by the UE until the processing latency has elapsed. It may be beneficial to activate the TCI state as soon as possible. In the procedure of FIG. 12, the TCI state is activated after the beam measurement report is provided by the UE to the network and the network sends a MAC CE to activate the TCI state in the UE. Then the UE waits for the activation delay before the TCI state can be used for reception of DL channels/signals with a quasi-co-location determined by the TCI state or transmission of UL channels/signals with a spatial filter (spatial relation) determined by the TCI state.

However, if the UE where to include the TCI state in the active state (e.g., activate the TCI state) at the time it provides a measurement report to the gNB, this may allow the UE to use the TCI state sooner.

In the present disclosure, dividing up the active TCI states into two groups is provided, for example, a first group can be activated by the network and a second group can be activated by the UE and indicated to the network. This can apply to the TCI states of a serving cell(s) as well as non-serving cells (e.g., cell with a PCI different from the PCI of the serving cell).

As illustrated in FIG. 12, in step 1202, a network configures measurement. In step 1204, the network configures source RS. In step 1206, the network receives a beam measurement report. In step 1208, the network configures TCI states. In step 1210, the network activates a subset of TCI states by MAC CE. In step 1212, a beam indication (e.g., the TCI state indicated in a DCI format) is determined from the activated TCI states. In step 1214, a UE receives measurement RS configuration from the network. In step 1216, the UE receives source RS configuration from the network. In step 1218, the UE measures measurement RS and provides a beam measurement report to a gNB. In step 1220, the UE receives TCI states configuration from the network. In step 1222, the UE receives the activated TCI states from the network. In step 1224, the UE receives the beam indication from the activated TCI states. Some of these steps may be combined or performed in a different order. In one example, in step 1204, the gNB configures the TCI states which includes the source RS for quasi-co-location and/or spatial relation. In step 1216, the UE receives such configuration. In one example, the gNB might activate TCI states by MAC CE signaling (UE receives the MAC CE activation command) before receiving a beam measurement report (the UE transmitting a beam measurement report). These steps can also be performed more than one time.

A UE supports N activated TCI states. A TCI state can be: (1) a DL TCI state, (2) an UL TCI state, and (3) a Joint TCI state. In one example, the UE supports M code points corresponding to the N activated TCI states. A TCI state code point can be: (1) a code point of a DL TCI state, (2) a code point of an UL TCI state, (3) a code point of a Joint TCI and (4) a code point of a pair of a DL TCI state and an UL TCI state. Where N and/or M can be at least one of: (1) specified in the system specifications; (2) a UE capability; (3) signaled by higher layer signaling (that in turn can be subject to a value reported by the UE in its capability reporting); or (4) updated by MAC CE signaling and/or L1 control signaling (that in turn can be subject to a value reported by the UE in its capability reporting).

For the N activated TCI states or M code points: (1) $N_B$ TCI states are activated by the network and/or $M_B$ code points of TCI states activated by the network; and (2) $N_U$ TCI states can be activated by the UE and/or $M_U$ code points of TCI states activated by the UE. Wherein, $N=N_B+N_U$ and/or $M=M_B+M$. In this example, $N_B$ and/or $N_U$ and/or $M_B$ and/or $M_U$ can be at least one of: (1) specified in the system specifications; (2) a UE capability; (3) signaled by higher layer signaling (that in turn can be subject to a value reported by the UE in its capability reporting); and (4) updated by MAC CE signaling and/or L1 control signaling (that in turn can be subject to a value reported by the UE in its capability reporting). A TCI state activated by the network is a TCI state signaled by the network for the UE to activate. A TCI state activated by the UE is a TCI state determined to be activated by the UE and signaled to network as being activated.

In one example, when signaling/configuration is used to determine N, $N_B$, and $N_U$ and/or M, $M_B$, and $M_U$, then: (1) the signaling can include values of N, $N_B$, and $N_U$ and/or M, $M_B$, and $M_U$; (2) the signaling can include values of N and $N_B$ and/or M and $M_B$, and the value of $N_U$ and/or $M_U$ is determined based on N and $N_B$ and/or M and $M_B$; (3) the signaling can include values of N and $N_U$ and/or M and $M_U$, and the value of $N_B$ and/or $M_B$ is determined based on N and $N_U$ and/or M and $M_U$; (4) the signaling can include values of $N_U$ and $N_B$ and/or $M_U$ and $M_B$, and the value of N and/or M is determined based on $N_U$ and $N_B$ and/or $M_U$ and $M_B$; (5) the signaling can include value of N and/or M and the value of $N_B$ and/or $M_B$ can be fixed, and the value of $N_U$ and/or $M_U$ is determined based on N and $N_B$ and/or M and $M_B$; (6) the signaling can include value of N and/or M and the value of $N_U$ and/or $M_U$ can be fixed, and the value of $N_B$ and/or $M_B$ is determined based on N and $N_U$ and/or M and $M_U$; (7) the signaling can include value of $N_B$ and/or $M_B$ and the value of N and/or M can be fixed, and the value of $N_U$ and/or $M_U$ is determined based on N and $N_B$ and/or M and $M_B$; (8) the signaling can include value of $N_B$ and/or $M_B$ and the value of $N_U$ and/or $M_U$ can be fixed, and the value of N and/or M is determined based on $N_B$ and $N_U$ and/or $M_B$ and $M_U$: (9) the signaling can include value of $N_U$ and/or $M_U$ and the value of N can be fixed, and the value of $N_B$ and/or $M_B$ is determined based on N and $N_U$ and/or M and $M_U$; and/or (10) the signaling can include value of $N_U$ and/or $M_U$ and the value of $N_B$ and/or $M_B$ can be fixed, and the value of N and/or M is determined based on $N_B$ and $N_U$ and/or $M_B$ and $M_U$.

In one example, the value of $N_U=1$ (fixed or when configured), i.e., the UE can activate only one TCI state. In one example, the value of $M_U=1$ (fixed or when configured), i.e., the UE can activate only TCI state(s) of one code point.

The value of $N_B$ and $N_U$ and/or $M_B$ and $M_U$ can be according to at least one of the following examples: (1) in one example, both $N_B$ and $N_U$ and/or $M_B$ and $M_U$ are positive (greater than 0); (2) in one example, $N_B>0$ and $N_U\geq 0$ and/or $M_B>0$ and $M_U\geq 0$, implying that the gNB activated TCI states (that are activated by the gNB) are always present, and the UE activated TCI states (that are activated by the UE) can be absent (when $N_U=0$) and/or the code points corresponding to gNB activated TCI states are always present, and the code points corresponding to UE activated TCI states (that are activated by the UE) can be absent (when $M_U=0$); and (3) in one example, $N_U>0$ and $N_B\geq 0$ and/or $M_U>0$ and $M_B\geq 0$, implying that the UE activated TCI states (that are activated by the UE) are always present, and the gNB activated TCI states (that are activated by the gNB) can be absent (when $N_B=0$) and/or the code points corresponding to UE activated TCI states (that are activated by the UE) are always present, and the code points corresponding to gNB activated TCI states (that are activated by the gNB) can be absent (when $M_B=0$).

In one example 1.1, up to N TCI states are activated by MAC CE signaling by the network (gNB). In one example 1.1a, up to M TCI state code points are activated by MAC CE signaling by the network (gNB).

In one example 1.1.1, the first (or the last) $N_B$ activated TCI states are set by the network and cannot be modified by the UE. The remaining $N_U=N-N_B$ TCI states can be modified by the UE. In one example 1.1a.1, the first (or the last) $M_B$ TCI state code points are set by the network and cannot be modified by the UE. The remaining $M_U=M-M_B$ TCI state code points can be modified by the UE.

In another example 1.1.2, a bitmap indicates the TCI states or TCI state code points that are set by the network and cannot be modified by the UE. The remaining TCI states or TCI state code points can be modified by the UE.

In another example 1.1.3, a bitmap indicates the TCI states or TCI state code points that can be modified by the UE. The remaining TCI states or TCI state code points are set by the network and cannot be modified by the UE.

In one example 1.2, a gNB activates $N_B$ TCI states by MAC CE signaling. The UE cannot modify the $N_B$ TCI states activated by the network. The UE can activate an additional $N_U$ TCI states. In one example 1.2a, a gNB activates $M_B$ TCI state code points by MAC CE signaling. The UE cannot modify the $M_B$ TCI state code points activated by the network. The UE can activate an additional $M_U$ TCI state code points.

Figure 13:
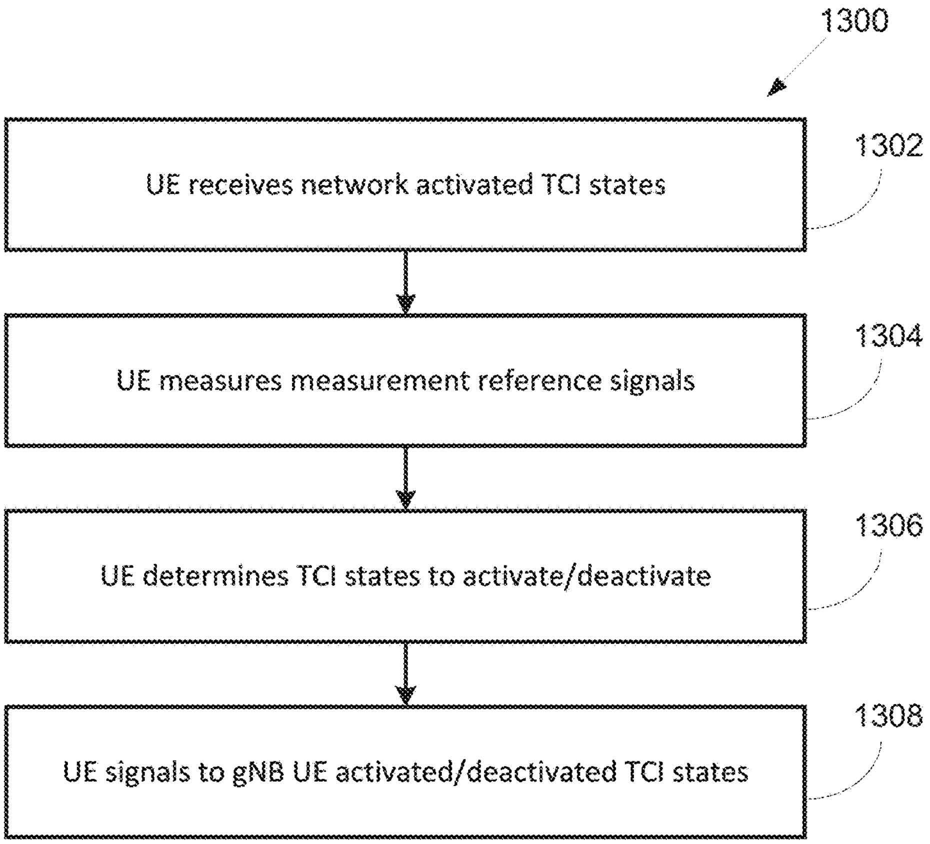
FIG. 13 illustrates a flowchart of a method for beam management according to embodiments of the present disclosure.

In one example 1.3, a UE (as illustrated in FIG. 13) measures a measurement reference signals and determines if a TCI state not in the activated state may be activated, possibly replacing a previously activated TCI state in the subset of $N_U$ TCI states or $M_U$ TCI state code points that can be activated by the UE. In this operation, the UE determines the UE activated TCI states (states activated by the UE) and/or corresponding TCI state code points from the RRC configured TCI states or the UE determines the UE activated TCI states and/or corresponding TCI state code points from a configured subset of the RRC configured TCI states and/or TCI state code points, wherein the network configures the subset of RRC configured TCI states and/or TCI state code points.

In one example 1.3, the UE further signals the UE activated or UE deactivated TCI states and/or TCI state code points to the network.

In one example 1.3.1, the UE activated or UE deactivated TCI states and/or TCI state code points are signaled as part of the beam measurement report.

In another example 1.3.2, the UE activated or UE deactivated TCI states and/or TCI state code points are signaled in a separate report. Wherein, the UE activated or UE deactivated TCI states and/or TCI state code points can be conveyed in at least one of: (1) L1 UCI on PUCCH and/or PUSCH; (2) L2 MAC CE message in PUSCH, wherein the PUSCH can be: (i) scheduled by an UL grant; (ii) configured grant Type 1; and/or (iii) configured grant Type 2; (3) 2-step RACH, e.g., in PUSCH of MsgA; and (4) 4-step RACH, e.g., Msg3 of 4-step RACH.

In one example 1.3.3, the report containing the UE activated or UE deactivated TCI states and/or TCI state code points is configured by the network.

In one example 1.3.4, the report containing the UE activated or UE deactivated TCI states and/or TCI state code points is initiated by the UE, for example when the UE determines one or more additional TCI states and/or TCI state code points that could be activated.

In one example 1.3.5, a UE can receive acknowledgement (confirmation) from the network after sending a message with the UE activated TCI state(s) and/or TCI state code point(s). If the UE does not receive the acknowledgement, the UE can resend the message with UE activated TCI state(s) and/or TCI state code point(s). If the UE continues to not receive an acknowledgement after one or more attempts the UE can revert back to the original active TCI states and/or TCI state code point(s).

In one example 1.3.5.1, the acknowledgement can be a one-bit flag in a DCI Format or in a MAC CE. For example, setting the bit to logical "1" indicates that the network has received the UE activated TCI state/TCI state code point message. Setting the bit to logical "0" indicates that no UE activated TCI state/TCI state code point message has been received by the network. In another example, the bit can be toggled every time a message with UE activated TCI states/TCI state code points is received. In one example, the DCI Format with the one-bit flag for acknowledgment can be: DCI Format 1_0 or DCI Format 1_1 or DCI Format 1_2 or DCI Format 0_0 or DCI Format 0_1 or DCI Format 0_2 or DCI Format 2_0 or DCI Format 2_1 or DCI Format 2_2 or DCI Format 2_3 or DCI Format beam indication.

In another example 1.3.6, the UE does not expect an acknowledgement (confirmation) from the network after sending a message with the UE activated TCI state(s)/TCI state code point(s).

Examples 1.3.5 and 1.3.6 can apply to UE-initiated TCI state activation and/or network/gNB initiated TCI state activation.

In one example 1.3.7, the UE activates one TCI state or one TCI state code point. The UE activated TCI state or TCI state code point becomes the active TCI state(s) for reception and/or transmission of DL and/or UL channels and signals following the indicated TCI state, based on the QCL assumption and/or spatial relation determined by the TCI state(s), at the UE after a beam application delay from the time of transmission of the channel conveying the UE activated TCI state or TCI state code point (or the channel conveying the corresponding acknowledgment). No further beam indication is signaled from the network. In one example, the UE activates TCI states or TCI state codes corresponding to $N_D$ DL TCI states, $N_U$ UL TCI states, and $N_J$ Joint TCI states. In one example, if $N_D$=1 and $N_J$=0, the UE activated DL TCI state becomes the active TCI state for reception of DL channels and signals following the indicated TCI state, based on the QCL assumptions determined by the DL TCI state at the UE after a beam application delay from the time of transmission of the channel conveying the UE activated TCI state/TCI state code point (or the channel conveying the corresponding acknowledgment). In one example, if $N_U$=1 and $N_J$=0, the UE activated UL TCI state becomes the active TCI state for transmission of UL channels and signals following the indicated TCI state, based on the spatial relation determined by the UL TCI state at the UE after a beam application delay from the time of transmission of the channel conveying the UE activated TCI state/TCI state code point (or the channel conveying the corresponding acknowledgment). In one example, if $N_J$=1, $N_D$=0 and $N_U$=0, the UE activated Joint TCI state becomes the active TCI state for reception/transmission of DL/UL channels and signals following the indicated TCI state, based on the QCL assumptions/spatial relation determined by the Joint TCI state at the UE after a beam application delay from the time of transmission of the channel conveying the UE activated TCI state/TCI state code point (or the channel conveying the corresponding acknowledgment). The spatial relation can determine an UL spatial transmission filter.

In one example 1.3.7.1, the UE does not expect an acknowledgement (confirmation) from the network after sending the channel conveying the UE activated TCI state/TCI state code point.

In another example 1.3.7.2, the UE can receive acknowledgement (confirmation) from the network after sending a message with the UE activated TCI state/TCI state code point. If the acknowledgment is not received, the UE activated TCI state or that corresponding to the TCI state code point is not applied for reception or transmission, or if applied, the UE reverts to the original TCI state. If the acknowledgment is received, the TCI state is applied after the beam application time. In a further example, the beam application time is from the channel conveying the acknowledgement rather than from the channel conveying the UE activated TCI state/TCI state code point. The channel conveying the acknowledgment is as described in example 1.3.5.1.

FIG. 13 illustrates a flowchart of a method 1300 for beam management according to embodiments of the present disclosure. The method 1300 as may be performed by a UE (e.g., 111-116 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, in step 1302, a UE receives a network activated TCI state/TCI state code points. In step 1304, the UE measures measurement reference signals. In step 1306, the UE determines TCI states/TCI state code points to activate/deactivate. The UE activated TCI states can replace previously activated TCI states that become deactivated. The UE activated TCI state code points can replace previously activated TCI state code points that become deactivated. In step 1308, the UE signals to a gNB UE activated/deactivated TCI states/TCI state code points, wherein the TCI state code points are code points of UE activated TCI states, and the TCI state code points can replace previously configured TCI state code points. A TCI state code point can be: (1) a code point of a DL TCI state, (2) a code point of an UL TCI state, (3) a code point of a Joint TCI and (4) a code point of a pair of a DL TCI state and an UL TCI state.

Figure 14:
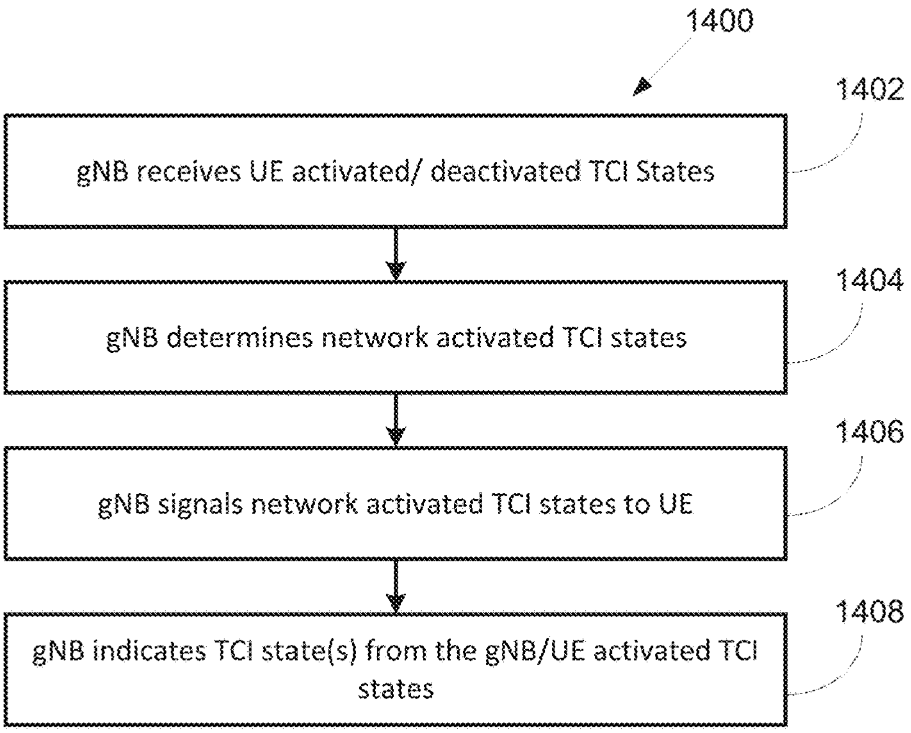
FIG. 14 illustrates a flowchart of a method for beam management according to embodiments of the present disclosure.

FIG. 14 illustrates a flowchart of a method 1400 for beam management according to embodiments of the present disclosure. The method 1400 as may be performed by a UE (e.g., 111-116 as illustrated in FIG. 1) or a BS. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In one example 1.4, a gNB (as illustrated in FIG. 13) receives a subset of UE activated or UE deactivated TCI states/TCI state code points in a beam measurement report or in a separate report.

In one example 1.4, the gNB can further activate or deactivate one or more of the $N_B$ TCI states and/or $M_B$ TCI state code points activated by the gNB based on the report from the UE. For example, an activated TCI state/TCI state code point can move from being in the subset of UE activated (activated by the UE) to being in the subset of gNB activated (activated by the gNB). In one example, the UE provides the gNB UE activated TCI states, the gNB configures TCI state code points using the UE activated TCI state. The TCI state code points are signaled to the UE, e.g., using a MAC CE. A TCI state code point can be: (1) a code point of a DL TCI state, (2) a code point of an UL TCI state, (3) a code point of a Joint TCI and (4) a code point of a pair of a DL TCI state and an UL TCI state.

In one example 1.4, the gNB can indicate a beam(s) (TCI state(s)) from the $N_B$ TCI states activated by the gNB or the $N_U$ TCI states activated by the UE and/or from the $M_B$ TCI state code points activated by the gNB or the $M_U$ TCI state code points activated by the UE. Or the gNB can just send a confirmation message (without any TCI states/TCI state code points) in response to the reception of the UE TCI states/TCI state code points, and the UE can use the TCI state/TCI state code point (if UE activated only one TCI state/TCI state code point) or one of the TCI states/TCI state code points (if the UE activated more than one TCI states/TCI state code points) for DL reception or/and UL transmission, potentially after a time duration from receiving the confirmation. Or, alternatively, the gNB does not send anything (i.e., this step is absent), and the UE can use the TCI state/TCI state code point (if UE activated only TCI state/TCI state code point) or one of the TCI states/TCI state code points (if the UE activated more than one TCI states/TCI state code points) for DL reception or/and UL transmission, potentially after a time duration from transmitting the UE activated TCI states/TCI state code points.

In one example 1.4.1, the network (e.g., gNB) sends an acknowledgement (confirmation) to the UE after receiving a message with the UE activated TCI state(s)/TCI state code point(s).

In one example 1.4.1.1, the acknowledgement can be a one-bit flag in a DCI Format or in a MAC CE. For example, setting the bit to logical “1” indicates that the network has received the UE activated TCI state/TCI state code point message. Setting the bit to logical “0” indicates that no UE activated TCI state/TCI state message has been received by the network. In another example, the bit can be toggled every time a message with UE activated TCI states/TCI state code points is received. In one example, the DCI Format with the one-bit flag for acknowledgment can be: DCI Format 1_0 or DCI Format 1_1 or DCI Format 1_2 or DCI Format 0_0 or DCI Format 0_1 or DCI Format 0_2 or DCI Format 2_0 or DCI Format 2_1 or DCI Format 2_2 or DCI Format 2_3 or DCI Format beam indication.

In another example 1.4.2, the network does not send an acknowledgement (confirmation) to the UE after receiving a message with the UE activated TCI state(s)/TCI state code point(s).

Examples 1.4.1 and 1.4.2 can apply to UE-initiated TCI state activation and/or network/gNB initiated TCI state activation.

In one example 1.4.3, the UE activates one TCI state/TCI state code point. The UE activated TCI state/TCI state code point becomes the active TCI state for reception and/or transmission of DL and/or UL channels and signals following the indicated TCI state, based on the QCL assumption and/or spatial relation determined by the TCI state at the UE after a beam application delay from the time of transmission of the channel conveying the UE activated TCI state/TCI state code point. No further beam indication is signaled from the network (or the channel conveying the corresponding acknowledgment). In one example, the UE activates TCI states or TCI state codes corresponding to $N_D$ DL TCI states, $N_U$ UL TCI states, and $N_J$ Joint TCI states. In one example, if $N_D=1$ and $N_J=0$, the UE activated DL TCI state becomes the active TCI state for reception of DL channels and signals following the indicated TCI state, based on the QCL assumptions determined by the DL TCI state at the UE after a beam application delay from the time of transmission of the channel conveying the UE activated TCI state/TCI state code point (or the channel conveying the corresponding acknowledgment). In one example, if $N_U=1$ and $N_J=0$, the UE activated UL TCI state becomes the active TCI state for transmission of UL channels and signals following the indicated TCI state, based on the spatial relation determined by the UL TCI state at the UE after a beam application delay from the time of transmission of the channel conveying the UE activated TCI state/TCI state code point (or the channel conveying the corresponding acknowledgment). In one example, if $N_J=1$, $N_D=0$ and $N_U=0$, the UE activated Joint TCI state becomes the active TCI state for reception/transmission of DL/UL channels and signals following the indicated TCI state, based on the QCL assumptions/spatial relation determined by the Joint TCI state at the UE after a beam application delay from the time of transmission of the channel conveying the UE activated TCI state/TCI state code point (or the channel conveying the corresponding acknowledgment). The spatial relation can determine an UL spatial transmission filter.

In one example 1.4.3.1, the network (gNB) does not transmit an acknowledgement (confirmation) to the UE after sending the channel conveying the UE activated TCI state/TCI state code point.

In another example 1.4.3.2, the network transmits an acknowledgement (confirmation) to the UE after receiving a message with the UE activated TCI state/TCI state code point. In a further example, the beam application time is from the channel conveying the acknowledgement rather than from the channel conveying the UE activated TCI state/TCI state code point. The channel conveying the acknowledgment is as described in example 1.4.1.1.

A UE supports $N_{nsc}$ activated TCI states (or TCI state code points—corresponding to activated TCI states that can be used as code points in a DCI format for beam indication) from a non-serving cell (a cell with a PCI different from a PCI of a serving cell). A TCI state can be: (1) a DL TCI state, (2) an UL TCI state, and (3) a Joint TCI state. A TCI state code point can be: (1) a code point of a DL TCI state, (2) a code point of an UL TCI state, (3) a code point of a Joint TCI and (4) a code point of a pair of a DL TCI state and an UL TCI state. Where $N_{nsc}$ can be at least one of: (1) specified in the system specifications; (2) a UE capability; (3) signaled by higher layer signaling (that in turn can be subject to a value reported by the UE in its capability reporting); (4) updated by MAC CE signaling and/or L1 control signaling (that in turn can be subject to a value reported by the UE in its capability reporting); (5) determined by the UE such $N=N_{nsc}+N_{sc}$, wherein $N_{sc}$ is the number of TCI states (or TCI state code points) active for a serving cell and N is the total number of active TCI states (or TCI state code points) across serving and non-serving cells. $N_{sc}$ can be a minimum value of TCI states (or TCI state code points) for serving cell, and can be specified in the system specification and/or configured or updated by RRC signaling and/or MAC CE signaling and/or L1 control signaling; or (6) the $N_{nsc}$ activated TCI states (or TCI state code points) can correspond to TCI states of one or more non-serving cells. Wherein $N=N_{sc}+N_{nsc}$. A TCI state code point can include TCI state(s) from a serving cell and TCI state(s) from a non-serving cell. Such TCI state code point can be, in one example counted as part of $N_{nsc}$, or in a second example counted as part of $N_{sc}$, or in a third example, counted separately from $N_{sc}$ and $N_{nsc}$.

In one example, when signaling/configuration is used to determine N, $N_{sc}$, and $N_{nsc}$, then: (1) the signaling can include values of N, $N_{sc}$, and $N_{nsc}$; (2) the signaling can include values of N and $N_{sc}$, and the value of $N_{nsc}$ is determined based on N and $N_{sc}$; (3) the signaling can include values of N and $N_{nsc}$, and the value of $N_{sc}$ is determined based on N and $N_{nsc}$; (4) the signaling can include values of $N_{nsc}$ and $N_{sc}$, and the value of N is determined based on $N_{nsc}$ and $N_{sc}$; (5) the signaling can include value of N and the value of $N_{sc}$ can be fixed, and the value of $N_{nsc}$ is determined based on N and $N_{sc}$; (6) the signaling can include value of N and the value of $N_{nsc}$ can be fixed, and the value of $N_{sc}$ is determined based on N and $N_{nsc}$; (7) the signaling can include value of $N_{sc}$ and the value of N can be fixed, and the value of $N_{nsc}$ is determined based on N and $N_{sc}$; (8) the signaling can include value of $N_{sc}$ and the value of $N_{nsc}$ can be fixed, and the value of N is determined based on $N_{sc}$ and $N_{nsc}$; (9) the signaling can include value of $N_{nsc}$ and the value of N can be fixed, and the value of $N_{sc}$ is determined based on N and $N_{nsc}$; or (10) the signaling can include value of $N_{nsc}$ and the value of $N_{sc}$ can be fixed, and the value of N is determined based on $N_{sc}$ and $N_{nsc}$.

In one example, the value of $N_{nsc}=1$ (fixed or when configured), i.e., one active TCI state (or TCI state code point) in a non-serving cell.

The value of $N_{sc}$ and $N_{nsc}$ can be according to at least one of the following examples: (1) in one example, both $N_{sc}$ and $N_{nsc}$ are positive (greater than 0); (2) in one example, $N_{sc}>0$ and $N_{sc}\geq 0$, implying that the SC active TCI states (or TCI state code points) are always present, and the NSC active TCI states (or TCI state code points) can be absent (when $N_{nsc}=0$); or (3) in one example, $N_{nsc}>0$ and $N_{sc}\geq 0$, implying that the NSC active TCI states (or TCI state code points) are always present, and the SC active TCI states (or TCI state code points) can be absent (when $N_{sc}=0$).

For the $N_{sc}$ activated TCI states (or TCI state code points) for a serving cell(s) can be: (1) $N_{Bsc}$ TCI states (or TCI state code points) are activated by the network; or (2) $N_{Usc}$ TCI states (or TCI state code points) can be activated by the UE. Wherein, $N_{sc}=N_{Bsc}+N_{Usc}$.

$N_{Bsc}$ and/or $N_{Usc}$ can be at least one of: (1) specified in the system specifications; (2) a UE capability; (3) signaled by higher layer signaling (that in turn can be subject to a value reported by the UE in its capability reporting); or (4) updated by MAC CE signaling and/or L1 control signaling (that in turn can be subject to a value reported by the UE in its capability reporting).

In one example, when signaling/configuration is used to determine $N_{sc}$, $N_{Bsc}$, and $N_{Usc}$, then: (1) the signaling can include values of $N_{sc}$, $N_{Bsc}$, and $N_{Usc}$; (2) the signaling can include values of $N_{sc}$ and $N_{Bsc}$, and the value of $N_{Usc}$ is determined based on $N_{sc}$ and $N_{Bsc}$; (3) the signaling can include values of $N_{sc}$ and $N_{Usc}$, and the value of $N_{Bsc}$ is determined based on $N_{sc}$ and $N_{Usc}$; (4) the signaling can include values of $N_{Usc}$ and $N_{Bsc}$, and the value of $N_{sc}$ is determined based on $N_{Usc}$ and $N_{Bsc}$; (5) the signaling can include value of $N_{sc}$ and the value of $N_{Bsc}$ can be fixed, and the value of $N_{Usc}$ is determined based on $N_{sc}$ and $N_{Bsc}$; (6) the signaling can include value of $N_{sc}$ and the value of $N_{Usc}$ can be fixed, and the value of $N_{Bsc}$ is determined based on $N_{sc}$ and $N_{Usc}$; (7) the signaling can include value of $N_{Bsc}$ and the value of $N_{sc}$ can be fixed, and the value of $N_{Usc}$ is determined based on $N_{sc}$ and $N_{Bsc}$; (8) the signaling can include value of $N_{Bsc}$ and the value of $N_{Usc}$ can be fixed, and the value of $N_{sc}$ is determined based on $N_{Bsc}$ and $N_{Usc}$; (9) the signaling can include value of $N_{Usc}$ and the value of $N_{sc}$ can be fixed, and the value of $N_{Bsc}$ is determined based on $N_{sc}$ and $N_{Usc}$; or (10) the signaling can include value of $N_{Usc}$ and the value of $N_{Bsc}$ can be fixed, and the value of $N_{sc}$ is determined based on $N_{Bsc}$ and $N_{Usc}$.

In one example, the value of $N_{Usc}=1$ (fixed or when configured), i.e., the UE can activate only one TCI state (or TCI state code point) in SC.

The value of $N_{Bsc}$ and $N_{Usc}$ can be according to at least one of the following examples: (1) in one example, both $N_{Bsc}$ and $N_{Usc}$ are positive (greater than 0); (2) in one example, $N_B>0$ and $N_U\geq 0$, implying that the gNB activated TCI states (that are activated by the gNB) (or TCI state code points) in SC are always present, and the UE activated TCI states (that are activated by the UE) (or TCI state code points) in SC can be absent (when $N_{Usc}=0$); or (3) in one example, $N_U>0$ and $N_{Bsc}\geq 0$, implying that the UE activated TCI states (that are activated by the UE) (or TCI state code points) in SC are always present, and the gNB activated TCI states (that are activated by the gNB) (or TCI state code points) in SC can be absent (when $N_{Bsc}=0$).

For the activated TCI states (or TCI state code points) for non-serving cells can be: (1) $N_{Bnsc}$ TCI states (or TCI state code points) are activated by the network and (2) $N_{Unsc}$ TCI states (or TCI state code points) can be activated by the UE. Wherein, $N_{nsc}=N_{Bnsc}+N_{Unsc}$.

$N_{Bnsc}$ and/or $N_{Unsc}$ can be at least one of: (1) specified in the system specifications; (2) a UE capability; (3) signaled by higher layer signaling (that in turn can be subject to a value reported by the UE in its capability reporting); or (4) updated by MAC CE signaling and/or L1 control signaling (that in turn can be subject to a value reported by the UE in its capability reporting).

In one example, when signaling/configuration is used to determine $N_{nsc}$, $N_{Bnsc}$, and $N_{Unsc}$, then: (1) the signaling can include values of $N_{nsc}$, $N_{Bnsc}$, and $N_{Unsc}$; (2) the signaling can include values of $N_{nsc}$ and $N_{Bnsc}$, and the value of $N_{Unsc}$ is determined based on $N_{nsc}$ and $N_{Bnsc}$; (3) the signaling can include values of $N_{nsc}$ and $N_{Unsc}$, and the value of $N_{Bnsc}$ is determined based on $N_{nsc}$ and $N_{Unsc}$; (4) the signaling can include values of $N_{Unsc}$ and $N_{Bnsc}$, and the value of $N_{nsc}$ is determined based on $N_{Unsc}$ and $N_{Bnsc}$; (5) the signaling can include value of $N_{nsc}$ and the value of $N_{Bnsc}$ can be fixed, and the value of $N_{Unsc}$ is determined based on $N_{nsc}$ and $N_{Bnsc}$; (6) the signaling can include value of $N_{nsc}$ and the value of $N_{Unsc}$ can be fixed, and the value of $N_{Bnsc}$ is determined based on $N_{nsc}$ and $N_{Unsc}$; (7) the signaling can include value of $N_{Bnsc}$ and the value of $N_{nsc}$ can be fixed, and the value of $N_{Unsc}$ is determined based on $N_{nsc}$ and $N_{Bnsc}$; (8) the signaling can include value of $N_{Bnsc}$ and the value of $N_{Unsc}$ can be fixed, and the value of $N_{nsc}$ is determined based on $N_{Bnsc}$ and $N_{Unsc}$; (9) the signaling can include value of $N_{Unsc}$ and the value of $N_{nsc}$ can be fixed, and the value of $N_{Bnsc}$ is determined based on $N_{nsc}$ and $N_{Unsc}$; or (10) the signaling can include value of $N_{Unsc}$ and the value of $N_{Bnsc}$ can be fixed, and the value of $N_{nsc}$ is determined based on $N_{Bnsc}$ and $N_{Unsc}$.

In one example, the value of $N_{Unsc}=1$ (fixed or when configured), i.e., the UE can activate only one TCI state (or TCI state code point) in NSC.

The value of $N_{Bnsc}$ and $N_{Unsc}$ can be according to at least one of the following examples: (1) in one example, both $N_{Bnsc}$ and $N_{Unsc}$ are positive (greater than 0); (2) in one example, $N_{Bnsc}>0$ and $N_{Unsc}>0$, implying that the gNB activated TCI states (that are activated by the gNB) (or TCI state code points) in NSC are always present, and the UE activated TCI states (that are activated by the UE) (or TCI state code points) in NSC can be absent (when $N_{Unsc}=0$); or (3) in one example, $N_{Usc}>0$ and $N_{Bsc}\geq 0$, implying that the UE activated TCI states (that are activated by the UE) (or TCI state code points) in NSC are always present, and the gNB activated TCI states (that are activated by the gNB) (or TCI state code points) in NSC can be absent (when $N_{Bsc}=0$).

The rest of the examples of component 1 follow for $N_{Bsc}$, $N_{Usc}$, $N_{Bnsc}$ and $N_{Unsc}$.

As discussed, in one embodiment of the present disclosure, partitioning the set of active TCI states (or TCI state code points) is provided into a first group that is activated by the network and a second group that can be activated by the UE and informed to the network. In another embodiment, partitioning of active TCI states (or TCI state code points) is provided into network activated TCI states (or TCI state code points) and UE activated TCI states (or TCI state code points) can apply to serving as well as non-serving cells.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:

a transceiver configured to receive first configuration information including a list of transmission configuration indication (TCI) states; and a processor operably coupled to the transceiver, the processor configured to determine TCI states, from the list of TCI states, to activate directly after measurement of reference signals associated with the TCI states, wherein the transceiver is further configured to transmit, to a base station (BS), information indicating the activated TCI states, wherein the first configuration information or a second configuration information includes a quantity of the TCI states, from the list of TCI states, to activate, and wherein:

the processor is further configured to activate only one downlink (DL) TCI state, only one uplink (UL) TCI state, or only one joint TCI state, the only one DL TCI state indicates an update to a quasi-co-location (QCL) assumption of DL channels and signals after a time T1, the only one UL TCI state indicates an update to a UL spatial filter of UL channels and signals after the time T1, the only one joint TCI state indicates (i) the update to the QCL assumption of the DL channels and signals and (ii) the update to the UL spatial filter of the UL channels and signals after the time T1, and T1 is a beam application time measured from a time of an acknowledgment of the activated TCI states.

2. The UE of claim 1, wherein:

the transceiver is further configured to transmit, to the BS, a message including code points corresponding to the activated TCI states to be used for beam indication, the code points are one of:

an activated downlink (DL) TCI state, an activated uplink (UL) TCI state, an activated joint TCI state, or a pair of activated DL TCI state and activated UL TCI state.

3. The UE of claim 1, wherein:

the transceiver is further configured to receive, from the BS, code points corresponding to the activated TCI states, the code points are one of:

an activated DL TCI state, an activated UL TCI state, an activated joint TCI state, or a pair of activated DL TCI state and activated UL TCI state.

4. The UE of claim 1, wherein:

the processor is further configured to deactivate previously activated TCI states and replace the deactivated TCI states with the activated TCI states, and the transceiver is further configured to transmit a list of one or more of the deactivated TCI states.

5. The UE of claim 1, wherein the activated TCI states are one of:

associated with a serving cell, or associated with a cell having a physical cell ID (PCI) different from a PCI of the serving cell.

6. The UE of claim 1, wherein the quantity of the TCI states to activate is greater than one and less than all of the TCI states in the list.

7. A base station (BS), comprising:

a transceiver configured to:

transmit first configuration information including a list of transmission configuration indication (TCI) states, and receive a list of activated TCI states based on the list of TCI states, wherein the activated TCI states to activate are determined by a user equipment (UE) from the list of TCI states directly after measurement of reference signals associated with the TCI states, wherein the first configuration information or a second configuration information includes a quantity of the TCI states, from the list of TCI states, to activate, and wherein:

only one downlink (DL) TCI state, only one uplink (UL) TCI state, or only one joint TCI state is activated, the only one DL TCI state indicates an update to a quasi-co-location (QCL) assumption of DL channels and signals after a time T1, the only one UL TCI state indicates an update to a UL spatial filter of UL channels and signals after the time T1, the only one joint TCI state indicates (i) the update to the QCL assumption of the DL channels and signals and (ii) the update to the UL spatial filter of the UL channels and signals after the time T1, and T1 is a beam application time measured from a time of an acknowledgment of the activated TCI states from a user equipment (UE).

8. The BS of claim 7, wherein:

the transceiver is configured to receive a message including code points corresponding to the activated TCI states to be used for beam indication, the code points are one of:

an activated downlink (DL) TCI state, an activated uplink (UL) TCI state, an activated joint TCI state, or a pair of activated DL TCI state and activated UL TCI state.

9. The BS of claim 7, wherein:

the transceiver is further configured to transmit code points corresponding to the activated TCI states, the code points are one of:

an activated DL TCI state, an activated UL TCI state, an activated joint TCI state, or a pair of activated DL TCI state and activated UL TCI state.

10. The BS of claim 7, wherein the transceiver is further configured to receive a list of one or more deactivated TCI states that are being replaced by the activated TCI states.

11. The BS of claim 7, wherein the activated TCI states are:

associated with a serving cell, or associated with a cell having a physical cell ID (PCI) different from a PCI of the serving cell.

12. The BS of claim 7, wherein the quantity of the TCI states to activate is greater than one and less than all of the TCI states in the list.

13. A method of operating a user equipment (UE), the method comprising:

receiving first configuration information including a list of transmission configuration indication (TCI) states;

determining TCI states, from the list of TCI states, to activate directly after measurement of reference signals associated with the TCI states;

transmitting, to a base station (BS), information indicating the activated TCI states, wherein the first configuration information or a second configuration information includes a quantity of the TCI states, from the list of TCI states, to activate; and activating only one downlink (DL) TCI state, only one uplink (UL) TCI state, or only one joint TCI state, wherein:

the only one DL TCI state indicates an update to a quasi-co-location (QCL) assumption of DL channels and signals after a time T1, the only one UL TCI state indicates an update to a UL spatial filter of UL channels and signals after the time T1, the only one joint TCI state indicates (i) the update to the QCL assumption of the DL channels and signals and (ii) the update to the UL spatial filter of the UL channels and signals after the time T1, T1 is a beam application time measured from a time of an acknowledgment of the activated TCI states from the UE.

14. The method of claim 13, further comprising:

transmitting, to the BS, a message including code points corresponding to the activated TCI states to be used for beam indication, wherein the code points are one of:

an activated downlink (DL) TCI state, an activated uplink (UL) TCI state, an activated joint TCI state, or a pair of activated DL TCI state and activated UL TCI state.

15. The method of claim 13, further comprising:

receiving, from the BS, code points corresponding to the activated TCI states, wherein the code points are one of:

an activated DL TCI state, an activated UL TCI state, an activated joint TCI state, or a pair of activated DL TCI state and activated UL TCI state.

16. The method of claim 13, further comprising:

deactivating previously activated TCI states and replacing the deactivated TCI states with the activated TCI states, and transmitting a list of one or more of the deactivated TCI states.

17. The method of claim 13, wherein the activated TCI states are one of:

associated with a serving cell, or associated with a cell having a physical cell ID (PCI) different from a PCI of the serving cell.

18. The method of claim 13, wherein the quantity of the TCI states to activate is greater than one and less than all of the TCI states in the list.

* * * * *